US008544346B2

(12) United States Patent
Peleg

(10) Patent No.: US 8,544,346 B2
(45) Date of Patent: *Oct. 1, 2013

(54) APPARATUS FOR TRANSFORMING ENERGY OF LIQUID FLOWING IN A LIQUID FLOW PATH

(75) Inventor: Dani Peleg, Kiryat Tivon (IL)

(73) Assignee: Hydrospin Monitoring Solutions Ltd, Netanya (IL)

( * ) Notice: Subject to any disclaimer, the term of this patent is extended or adjusted under 35 U.S.C. 154(b) by 84 days.

This patent is subject to a terminal disclaimer.

(21) Appl. No.: 13/077,788

(22) Filed: Mar. 31, 2011

(65) Prior Publication Data

US 2011/0221197 A1    Sep. 15, 2011

Related U.S. Application Data

(63) Continuation-in-part of application No. 12/730,116, filed on Mar. 23, 2010, now Pat. No. 7,980,143, and a continuation-in-part of application No. 11/658,689, filed on Jan. 25, 2007, now Pat. No. 7,712,383, and a continuation of application No. PCT/IL2005/000774, filed on Jul. 21, 2005.

(51) Int. Cl.
*G01F 1/05* (2006.01)

(52) U.S. Cl.
USPC ........................................ 73/861.79

(58) Field of Classification Search
USPC ............................. 73/861.77–861.79
See application file for complete search history.

(56) References Cited

U.S. PATENT DOCUMENTS

| 4,140,013 | A  | 2/1979 | Hunger |
| 4,159,188 | A  | 6/1979 | Atencio .................... 405/78 |
| 5,027,653 | A  | 7/1991 | Foran, Jr. |
| 6,011,334 | A  | 1/2000 | Roland |
| 6,106,705 | A  | 8/2000 | Giordano et al. |
| 6,526,907 | B1 | 3/2003 | Donehue |
| 6,619,138 | B2 | 9/2003 | Kettle, Jr. et al. |
| 6,848,503 | B2 | 2/2005 | Schultz |
| 6,854,342 | B2 | 2/2005 | Payne et al. |
| 6,926,821 | B2 | 8/2005 | Giordano et al. |

(Continued)

FOREIGN PATENT DOCUMENTS

| WO | 03/023223    | 3/2003 |
| WO | 2006/011134  | 2/2006 |

OTHER PUBLICATIONS

Northwest PowerPipe, "Advanced Turbine Technology Generates Renewable Energy in Water Transmission Systems", Vancouver, Washington, Aug. 8, 2009.

(Continued)

*Primary Examiner* — Jewel V Thompson
(74) *Attorney, Agent, or Firm* — Ladas & Parry, LLP

(57) ABSTRACT

An apparatus for positioning thereof in a liquid flow path, comprising: a housing configured to be received in the flow path and having a liquid inlet and a liquid outlet defining a flow direction therebetween; a current generator including a shaft supported by the housing and having a rotor mounted thereon and having a plurality of vanes, the shaft extending in the housing along the flow direction allowing rotation of the rotor with the vanes by liquid passing through the generator, and a stator associated with the rotor for producing electrical signals corresponding to the rotation of the rotor; and, electrical wiring for electrically connecting the current generator to a power receiver for transferring the electrical signals thereto.

20 Claims, 15 Drawing Sheets

(56) References Cited

U.S. PATENT DOCUMENTS

| | | | |
|---|---|---|---|
| 7,111,520 B2 | 9/2006 | Payne | |
| 7,712,383 B2 | 5/2010 | Peleg | |
| 7,980,143 B2 * | 7/2011 | Peleg | ......................... 73/861.78 |

OTHER PUBLICATIONS

Global Water Instrumentation, Inc., Adjustable Turbine flow Sensor. http://www.globalw.com/products/TX100.html. Webpage printed on Jan. 31, 2009.

SeaMetrics., IP 115/215 Hot-tap Insertion Flow Sensor Specifications, Feb. 15, 2005.

Office Action for related U.S. Appl. No. 12/730,116 (Patent No. 7980143) dated Nov. 1, 2010.

IPRP/WO for related PCT/IL2005/000774 issued on Jan. 30, 2007.

Office Action for related U.S. Appl. No. 11/658,689 (Patent No. 7712383) dated Apr. 24, 2009.

Annex to ISR for related PCT/IL2012/050107.

* cited by examiner

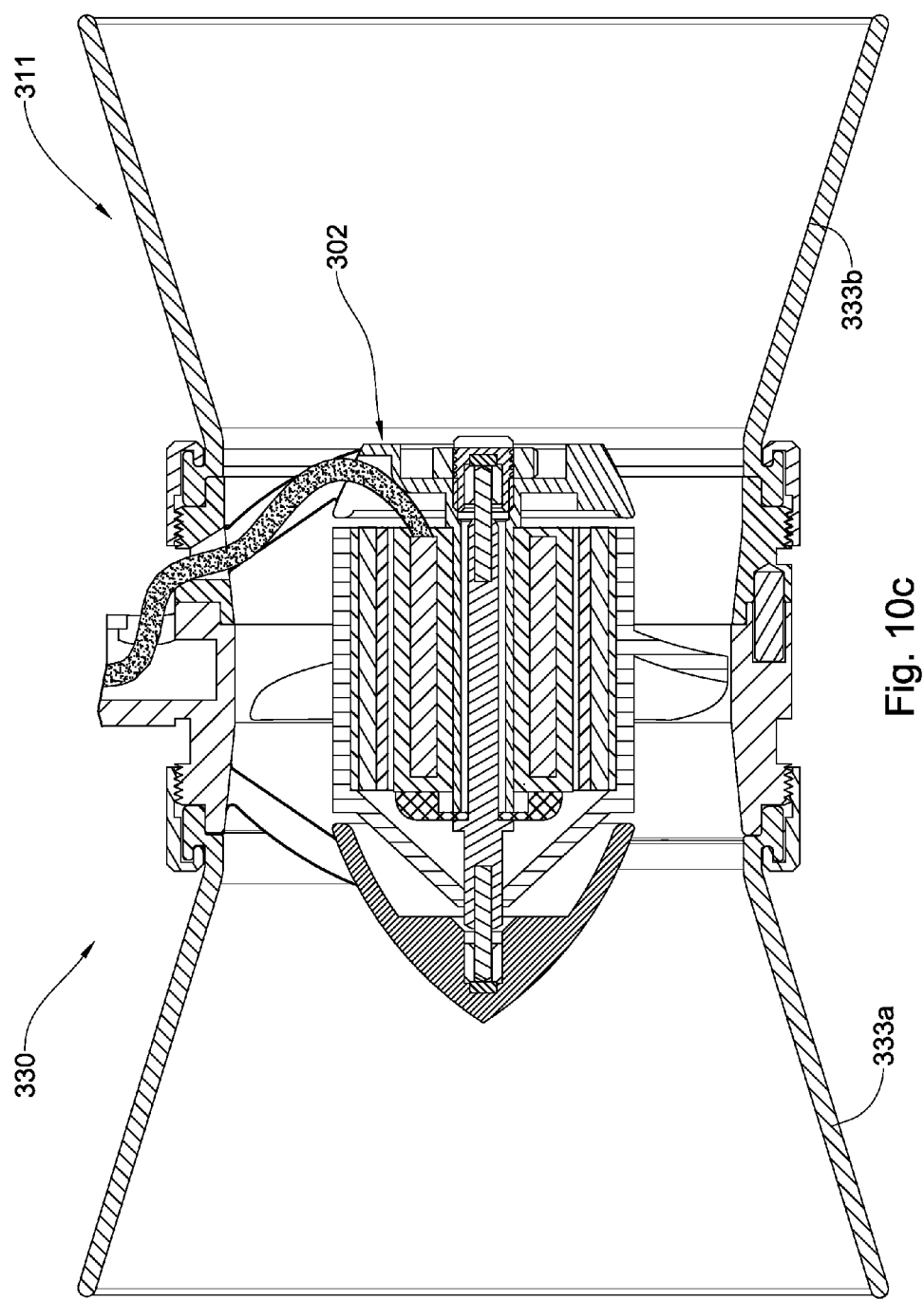

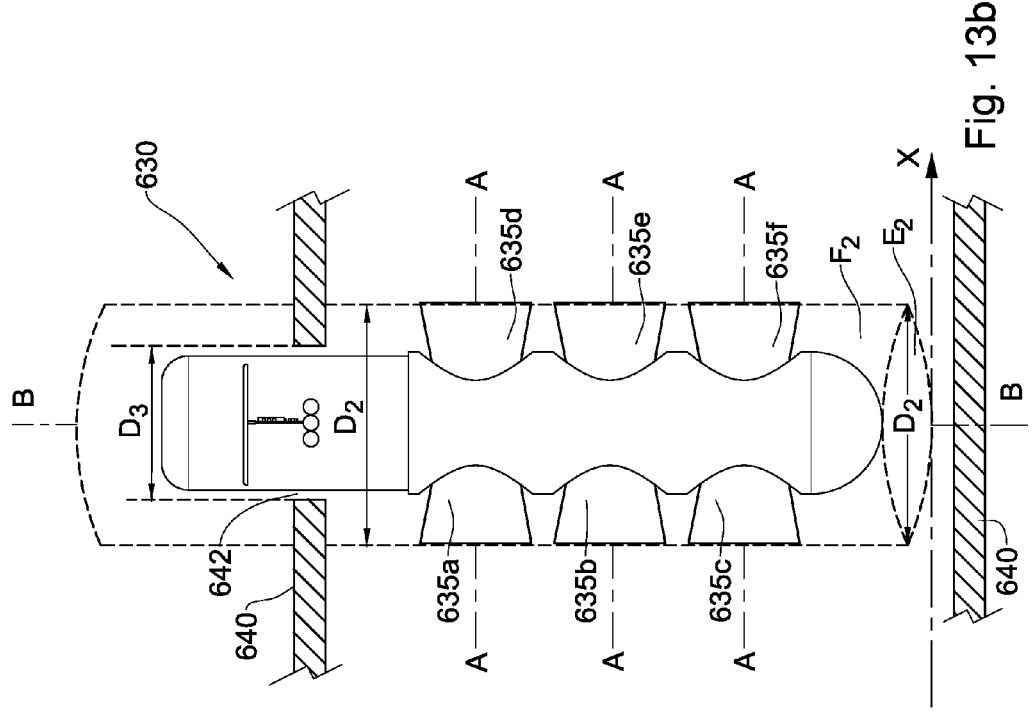
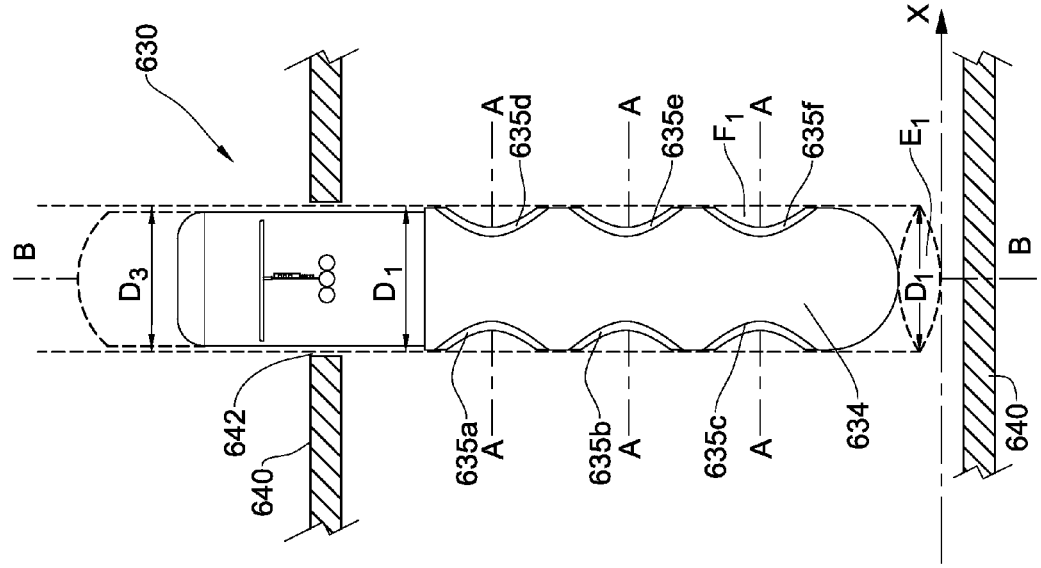

APPARATUS FOR TRANSFORMING ENERGY OF LIQUID FLOWING IN A LIQUID FLOW PATH

CROSS REERENCE TO RELATED APPLICATIONS:

This is a Continuation-In-Part of Continuation in Part of U.S. application Ser. No. 12/730,116, filed on Mar.23, 2010 in which is a Continuation in Part of U.S. application Ser. No.11/658,689, filed on Jan.25, 2007 which is a National Phase of PCT/IL2005/000774, filed on Jul. 26, 2004, and claims priority from Isaraeli Patent Application No. 163208 filed date, 2004, the contents of which are hereby incorporated by reference in their entirety.

FIELD OF THE INVENTION

The presently disclosed subject matter relates to an apparatus for transforming energy of liquid flowing in a liquid flow path into electrical energy. Specifically, the presently disclosed subject matter is concerned with electric power generators for pipelines based on turbine-driven generators to be energized by the flow of liquid.

BACKGROUND OF THE INVENTION

Electric power generators driven by liquid flowing under pressure in pipes are known, for example, from U.S. Pat. Nos. 6,011,334, 6,526,907 and 6,848,503, disclosing rotational drive means disposed inside the pipes axially along the direction of flow.

SUMMARY OF THE INVENTION

According to one aspect of the presently disclosed subject matter, it refers to an apparatus for use with a liquid supply pipeline, for transforming energy of liquid passing therethrough into electrical energy, the apparatus comprising:

a housing configured to be received within the pipeline and having a liquid inlet and a liquid outlet defining a flow direction therebetween, at least one current generator including a rotor supported by the housing and having a shaft and a plurality of vanes attached thereto, the shaft extending in the housing along the flow direction allowing rotation of the vanes by liquid passing through the generator, and a stator associated with the rotor for producing electrical signals corresponding to the rotation of the rotor, and electrical wiring for electrically connecting the at least one current generator to a power storage means for transferring said electrical signals thereto.

The apparatus can further include the power storage means.

It should be understood that the liquid inlet and liquid outlet can be interchangeable.

The current generator can comprise magnets attached to free ends of at least some of the vanes and at least one electrical winding disposed on, or adjacent to, the housing.

The association between the rotor and the stator can be effected by magnetic transmission. In particular examples, the rotor can comprise magnetic elements, and the stator can comprise at least one coil and the magnetic elements of the rotor rotate in close relation to windings of the at least one coil. For example, the stator can be in the form of a coil and the vanes can be at least partly surrounded by magnetic elements rotating in close relation to windings of the coil. In another example, the vanes can be at least partly made of magnetic material and can be rotatable in close relation to windings of the coil. The coil can be located inside and/or outside the housing.

The current generator can comprise an upstream housing part and a downstream housing part in the form of separate components spaced by the rotor and supporting the shaft at two ends thereof with the shaft being freely rotatable with respect to the upstream and downstream housing parts. For example, the housing parts can be in the form of apertured covers. The upstream and downstream housing parts can be made of materials having different magnetic properties. For example, at least the downstream part can be configured as a strainer constantly or intermittently magnetized in order to block ferromagnetic particles in the flow of liquid.

The housing can be insertable through a sealable connection into the liquid supply pipeline. For example, the housing can be affixable to, and detachable from, the pipeline via a sealable opening.

The apparatus can comprise a plurality of the current generators arranged in parallel within the housing. The one or more current generators can be arranged in a direction transverse to the flow direction.

The apparatus can further be configured for measuring the amount of liquid passing through the current generator, and further comprise: a controller for receiving the electrical signals for processing and producing output signals indicative of the amount of liquid, and wherein the power storage means includes a power storage and supply unit configured to charge the apparatus and to supply power to the controller required for its operation. For example, the power storage and supply unit can be rechargeable and/or the power storage means can be configured to provide power to the apparatus during cessation or low flow of liquid. The apparatus can further include an integrator for calculating the volume of liquid passing through the housing and/or an electrically actuated gating device disposed at, or adjacent to, the inlet or outlet of the current generator for selectively blocking liquid flow therethrough. In some particular examples, a heat exchanger can be provided that is configured to use liquid from the pipeline to cool or heat the power storage and supply unit.

According to another aspect of the presently disclosed subject matter, there is provided an apparatus comprising a housing to be serially installed in a pipeline in a way allowing the liquid to pass through the housing; a turbine installed inside the housing so as to be rotatable by the passing liquid; a generator pivotally or geared joined to the turbine to generate electrical power according to the turbine's rotation; and a controller configured to measure the liquid flow in a way of integrating the supplied electrical power in a time sequence.

The generator can be geared by two cogwheels, first cogwheel on the generator axis and second cogwheel on the turbine axis.

The apparatus can further include a valve installed in the housing, wherein the controller, according to predetermined criteria, operates the valve.

The controller can be programmable and operative, according to predetermined criteria, to perform tasks including opening and closing valves, transmitting measured information and controlling other means.

The controller can further include a transceiver, this transceiver enables the controller to transmit and receive information, enables the controller to command other controllers or to be commanded by other controllers and enables remote programming of this controller.

The apparatus can further include an electrical power storage, wherein the generator can charge the electrical power storage. This power storage can be a chargeable battery, a capacitor or both.

The generator can be integrated with a turbine in a way that the rotor of the generator is built in the turbine's blade and the stator of the generator is built in the housing.

Alternatively, the generator can be integrated with the turbine in a way that the rotor of the generator is built on the turbine's blade and the stator of the generator is built in the turbine's axis.

The apparatus can further include a wall, made of a non magnetic material, separating between the turbine and the generator, wherein the drive coupling between the turbine and the generator is done by first and second magnets, wherein the first magnet is installed on the turbine axis near the wall and the first magnet drives the second magnet that is located on the other side of the wall—against the first magnet—and the second magnet is installed on the generator axis.

The housing of the apparatus can be separated into a first and second liquid passage and having a large turbine for high flow liquid and small turbine for low flow liquid, both connected to generators, wherein the large turbine is located in the first passage and the small turbine is located in the second passage and wherein the first passage has a valve that enables or disables liquid to pass through the passage according to a predetermined criteria and wherein the criteria can be, inter alia, pressure differences or a command from the controller. The controller can be configured to close the valve in a low flow of liquid through the apparatus, and open it when the flow is rising over a predetermined threshold.

According to further aspect of the presently disclosed subject matter, there is provided an apparatus for use in a liquid, or any other flowing material, comprising: a housing to be serially installed to a liquid pipeline in a way that the supplying liquid passes through the housing; a turbine, the turbine is installed inside the housing, wherein the turbine is spin by the passing liquid; a multi polar magnet that is attached to the turbine, creating a rotate able assembly; a claw pole stator with a coil, wherein the assembly is rotating inward inducing a full wave AC electrical power in the coil; a diode bridge that rectified the AC electrical power into DC electrical power; a power storage means, capable to store the DC electrical power; and a controller, capable to calculate the supplied liquid in a way of integrating the DC or AC electrical power in a time sequence.

According to still another aspect of the presently disclosed subject matter, there is provided an apparatus sealingly built into a tubular body having a longitudinal axis, and comprising at least one turbine-driven generator having a rotor rotatable about an axis transverse to the longitudinal axis of the said tubular body, and a stator configured to generate electrical signals in accordance the rotation of the rotor, said tubular body being insertable into a liquid flow pipeline through the pipeline's wall via a sealable connection so that its longitudinal axis is transverse to the liquid flow direction and so that only a part of the liquid flow in the pipeline, passes through said turbine-driven generator. The apparatus can be used either solely for generating electrical energy or for measuring the liquid flow, and optionally controlling it and communicating control data to the exterior of the pipeline.

According to a still further aspect of the subject matter of the present application, there is provided a combination of a pipeline configured to allow liquid flow therethrough, with the apparatus according to one or more aspects described above.

At least one of the liquid inlet and the liquid outlet can comprise at least one section extending along the flow direction, the at least one section being at least one of: converging, diverging, tubular and combinations thereof. For example, such a section can be converging in the direction towards the interior of the housing along the flow direction.

At least one of the liquid inlet and the liquid outlet, or at least the above section thereof, can be deployable from an undeployed state to at least one deployed state. In particular, at least one of the liquid inlet and the liquid outlet can be inflatable. At least one of the inlet and the outlet can have at least one of internal ribs and external ribs.

Optionally, at least one of the liquid inlet and the liquid outlet can comprise at least one rigid section.

At least one of the liquid inlet and the liquid outlet can be configured for changing at least one of its geometrical parameters in response to the change of a rate of liquid flow therethrough.

According to a further aspect of the subject matter of the present application, there is provided an apparatus for positioning thereof in a liquid flow path, for transforming energy of liquid passing therethrough into electrical energy, which comprises: at least one housing configured to be received in said flow path and having a liquid inlet and a liquid outlet defining a flow direction therebetween; at least one current generator including a shaft supported by said housing and a rotor mounted thereon and having a plurality of vanes, said shaft extending in the housing along said flow direction allowing rotation of the rotor with said vanes by liquid passing through the generator, and a stator associated with said rotor for producing electrical signals corresponding to the rotation of said rotor; and electrical wiring for electrically connecting the at least one current generator to a power receiver for transferring said electrical signals thereto,the at least one of the liquid inlet and the liquid outlet being configured for taking an undeployed state and a deployed state.

The at least said one of the liquid inlet and the liquid outlet can be inflatable, from said undeployed state in which it is deflated into said deployed state in which it is inflated.

The housing of the apparatus can be configured for being received within a pipeline.

The apparatus can be configured to be inserted into said pipeline through a sealable opening when at least said one of the liquid inlet and the liquid outlet is in said undeployed state, and to take said deployed state when said apparatus is positioned within said pipeline.

The power receiver of the apparatus can be a power storage means.

The rotor of the apparatus can comprise at least one magnetic element.

The stator of the apparatus can comprise at least one coil, and the rotor is rotatable with its magnetic unit with respect to windings of the at least one coil, so as to produce the electrical signals.

The at least one coil can be located within the housing, and also can be disposed within the rotor.

The rotor can comprise a vane unit including a hollow rotor body having an external surface and an internal surface, said vanes extending outwardly from the external surface; and a magnet unit fixed to the internal surface of the rotor body and defining a rotor interior space, said coil being disposed within said interior space.

The magnet unit can have a magnet housing and said at least one magnetic element disposed therein.

The magnet housing can be made of a material which is different from that of which said vanes are made. For example, the vanes material can be flexible to facilitate the passage of liquid between the vanes in the flow direction, whilst the housing material can be more rigid. The magnet housing material must allow the passage a magnetic field therethrough.

According to a still further aspect of the subject matter of the present application, there is provided an apparatus for positioning thereof in a liquid flow path, for transforming energy of liquid passing therethrough into electrical energy, which comprises: at least one housing configured to be received in said flow path and having a liquid inlet and a liquid outlet defining a flow direction therebetween; at least one current generator supported by said housing and including: a shaft with a rotor mounted thereon and having a plurality of vanes, the shaft extending in the housing along said flow direction allowing rotation of the rotor with said vanes by liquid passing through the generator; and a stator at least partially disposed within the rotor and associated therewith for producing electrical signals corresponding to the rotation of the of the rotor with respect to the stator; and electrical wiring for electrically connecting the at least one current generator to a power receiver for transferring said electrical signals thereto.

The stator can be also fully disposed within the rotor.

The association between the rotor and the stator can be effected by magnetic transmission.

The rotor can comprise at least one magnetic element and the stator can comprise at least one coil around which said at least one magnetic element is configured to rotate so as to produce the electrical signals.

The rotor can comprise a vane unit including a hollow rotor body having an external surface and an internal surface, said vanes extending outwardly from the external surface; and a magnet unit fixed to the internal surface of the rotor body and defining a rotor interior space, said coil being disposed within said interior space.

The magnet unit can have a magnet housing and said at least one magnetic element disposed therein. The magnet housing can be made of a material which is different from that of which said vanes are made. For example, the vanes material can be flexible to facilitate the passage of liquid between the vanes in the flow direction, whilst the housing material can be more rigid. The housing material must allow the passage a magnetic field therethrough. The stator can comprise at least one coil, and the rotor is rotatable with the magnetic unit with respect to windings of the at least one coil, so as to produce the electrical signals.

According to a still further aspect of the subject matter of the present application, there is provided a method for transforming energy of liquid passing in a liquid flow path into electrical energy, which comprises: providing an apparatus comprising: at least one housing configured to be received in said flow path and having a liquid inlet and a liquid outlet defining a flow direction therebetween; at least one current generator including a shaft supported by said housing, a rotor with a plurality of vanes attached thereto, said shaft extending in the housing along said flow direction allowing rotation of the rotor with said vanes by liquid passing through the generator, and a stator associated with said rotor for producing electrical signals corresponding to the rotation of said rotor; and electrical wiring for electrically connecting the at least one current generator to a power receiver for transferring said electrical signals thereto; inserting the housing with at least said one of the liquid inlet and the liquid outlet in said undeployed state into said liquid flow path so that said flow direction is substantially parallel to the direction of the flow of said liquid; having at least said one of the liquid inlet and the liquid outlet take said deployed state; allowing rotation of the rotor by liquid passing through the housing, and correspondingly producing electrical signals by the stator; and transferring said electrical signals through the electrical wiring from the at least current generator to said power receiver.

The step of inserting the housing into the liquid flow path can be performed by inserting the housing into a a pipeline.

The step of having at least said one of the liquid inlet and the liquid outlet take the deployed state can comprise a step of inflating the same.

The method can further comprise a step of changing at least one geometrical parameter of at least said one of the liquid inlet and the liquid outlet in response to the rate of the liquid flow therethrough.

The method can further comprise a step of measuring the amount of liquid passing through the current generator.

BRIEF DESCRIPTION OF THE DRAWINGS

In order to understand the invention and to see how it can be carried out in practice, non-limiting examples will now be described with reference to the accompanying drawings, in which:

FIG. 10c is a cross-sectional view an apparatus similar to that shown in FIG. 9b, using features shown in FIGS. 10a-b;

DETAILED DESCRIPTION OF EMBODIMENTS

Throughout the specification the terms current generator and turbine-driven generator can be used interchangeably while having the same meaning. Also, throughout the specification the terms vanes and vanes can be used interchangeably.

Figure 1:
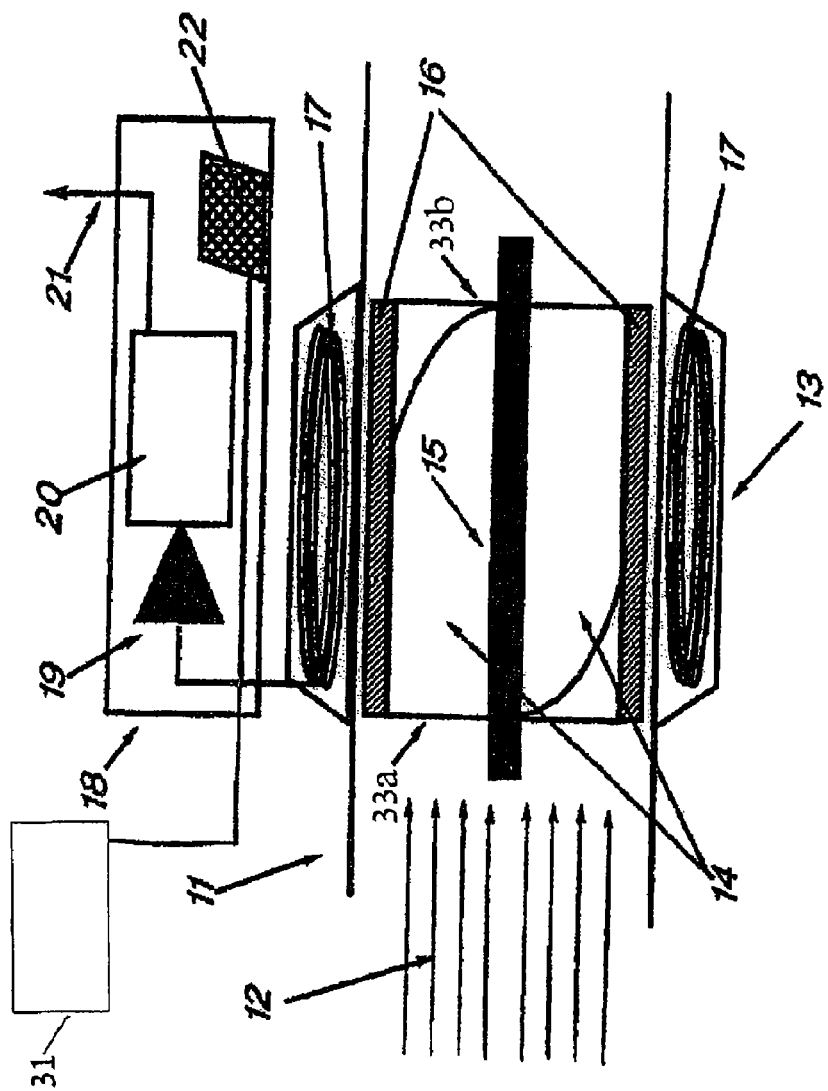
FIG. 1 is a schematic view of an apparatus according to one example of the presently disclosed subject matter.

FIG. 1 illustrates a block diagram and a cross section of an example of an apparatus according to the presently disclosed subject matter. Generally, the apparatus includes a housing 11 configured to be received within a pipeline (not shown in FIG. 1) and having a liquid inlet 33a and a liquid outlet 33b defining a flow direction therebetween. The apparatus further includes a current generator in the form of a turbine including a rotor supported by the housing 11 and having a shaft 15 and a plurality of vanes 14 attached thereto. The shaft 15 extends in the housing along the flow direction allowing, rotation of the vanes 14 by liquid passing through the generator, and a stator 13 associated with the rotor for producing electrical signals corresponding to the rotation of the rotor. The apparatus further includes a power storage means 22 to which the current generator is electrically connected, for receiving electrical signals.

Liquid inlet 33a and liquid outlet 33b can be interchangeable, with the apparatus of the presently disclosed subject matter being configured for transforming energy of liquid that can flow in either of the two directions in a pipeline at different times.

More particularly, through the housing 11 a liquid 12 is passing and spins the turbine, which is comprised of the rotor having the rotor vanes 14 and magnets 16 that are installed on the edges of each vane and rotatable on the shaft 15. The stator 13 is built on the housing 11 having coils 17 where the electrical power is created according to the spin of the vanes 14 with the magnets 16, i.e., rotor.

Figure 2:
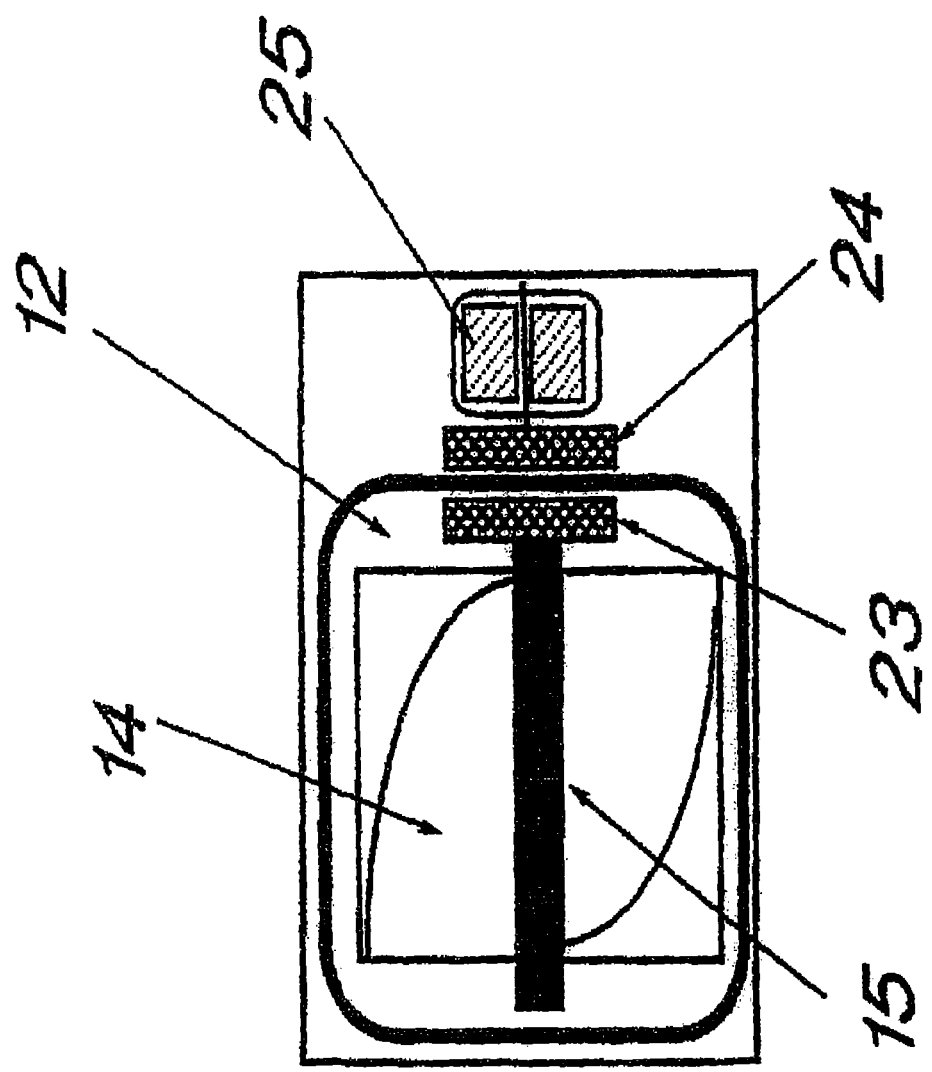
FIG. 2 is a schematic view of a magnetic generator drive that can be used in the apparatus shown in FIG. 1.

As an addition to this example, some of the electrical power can be transferred to a controller 18, wherein any parameter of the created electrical power, i.e., voltage, current or frequency, can be used to calculate the liquid quantity that passes during a time sequence. Controller 18 includes an integrator 19 to calculate the passed liquid, a control unit 20 capable to store information and use it for controlling valves or controlling other systems via a communication channel 21. The controller 18 is operated by the power storage means 22. This power storage means 22 e.g., chargeable battery or capacitor, is charged by the power that is created by the apparatus itself FIG. 2 illustrates an example with a magnetic drive current generator. The liquid 12 is passing and rotating the turbine with rotor vanes 14 and shaft 15. A first magnet 23 is installed on the shaft 15 and rotates with it. The first magnet 23 drives the second magnet 24 that is located over the housing wall and the second magnet 24 rotates the generator 25.

Figure 3:
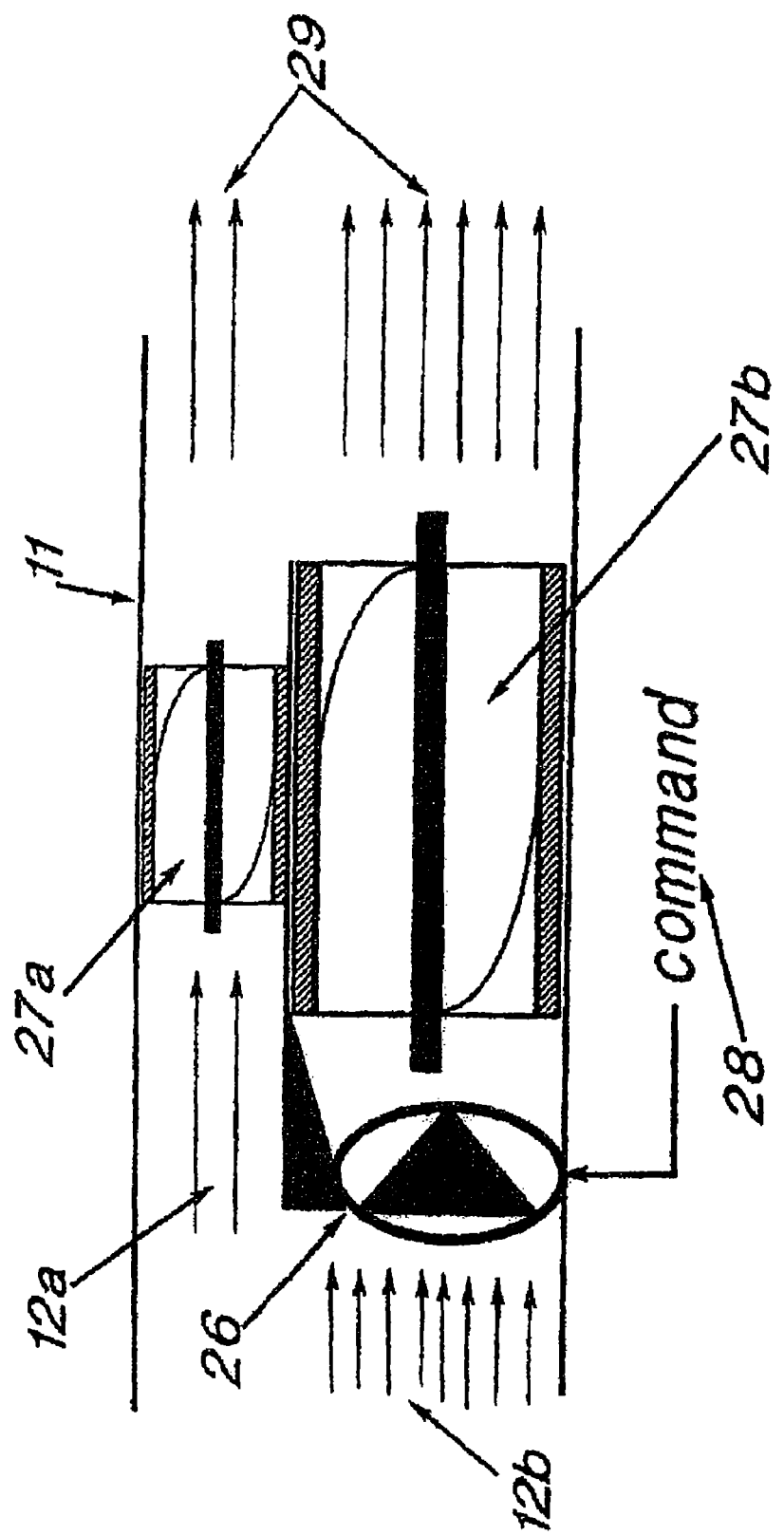
FIG. 3 is a schematic view of an apparatus according to another example of the presently disclosed subject matter.

FIG. 3 illustrates a cross section of an example with two passages: one for low flow and the other is opened in a high flow. This configuration is needed to better extract energy and perform more accurate measurements in cases of significant flow changes. To accurate the flow measurement, a small turbine 27a is needed for the low flow and a large turbine 27b is needed for the high flow. In such a configuration the liquid 12a & 12b enters the housing 11. As long the pressure is low, which means slow flow, the valve 26 is closed and liquid 12a slowly flows through the small turbine 27a. When the pressure is increased over a predetermined threshold a command 28 from the controller (not shown) opens the valve 26 enabling liquid 12b to pass through the large turbine 27b. In case of reducing flow the command 28 will close the valve 26. The controller (not shown) calculates from both turbines the supplied liquid 29.

The apparatus according to any of the examples shown above, can be used to direct some or all of the electric power generated thereby to a power storage means different from the power storage means 22, for example to an external power storage means 31. This external power storage means 31 can be used for any purpose, e.g., to charge accumulators, power water supply sensors or pumps, to be introduced into the public power grid or any other electrical infrastructure, etc.

Figure 4:
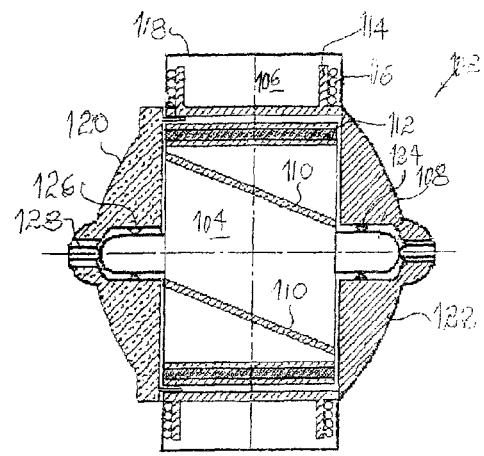
FIG. 4 is a cross-sectional view of a turbine-driven generator that can be used in an apparatus, according to a further example of the presently disclosed subject matter, taken along a plane comprising axis of rotation of the generator's rotor and longitudinal axis of the apparatus.

FIG. 4 illustrates a turbine-driven generator 102 that can be used in an apparatus mountable within a liquid supply pipeline for transforming energy of liquid passing therethrough into electrical energy.

The turbine-driven generator 102 includes a rotor 104 and a stator 106. The rotor 104 has a shaft 108, a plurality of vanes 110 and a ring or several magnetic elements 112 affixed to the periphery of the rotor 104. Alternatively, the vanes 110 themselves can be at least partially made of magnetic material. The stator 106 includes a body 114 supporting windings of a coil 116, a shield 118 housing the coil 116, an upstream housing part in the form of a strainer 120, e.g., a mechanical, electronic or electromagnetic strainer facing the direction of liquid flow, and a downstream housing part in form of an apertured liquid output surface 122, which can have different or similar magnetic properties as those of strainer 120. The strainer 120 and surface 122 thus constitute covers for the rotor 114. The electromagnetic strainer 120 can be constantly or intermittently magnetized. The shaft 108 is rotationally seated in low friction bearings 124, 126, advantageously formed in the strainer 120 and surface 122, which bearings are configured to be rinsed by the flowing liquid through passage 128.

Figure 5:
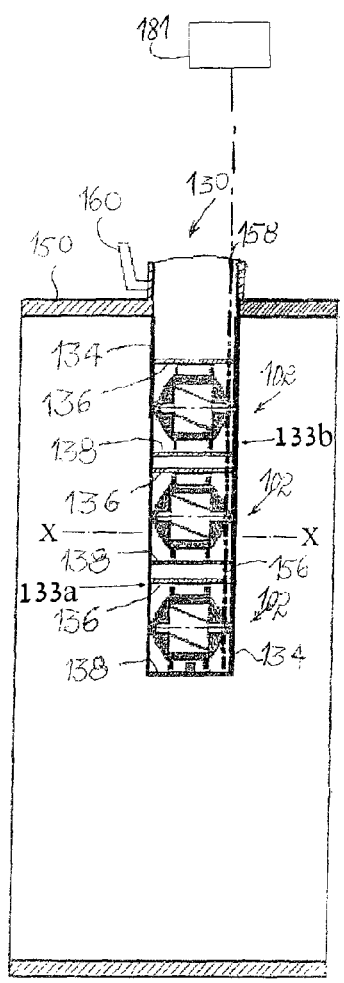
FIG. 5 is cross-sectional view, drawn to a smaller scale, of an apparatus using turbine-driven generators as shown in FIG. 4, in a plurality of turbine-driven generator units, disposed in a liquid flow pipeline, according to an example of the presently disclosed subject matter, the cross-sectional view being taken along a plane passing through the longitudinal axis of the apparatus and axes of rotation of rotors of the generators.
Figure 6:
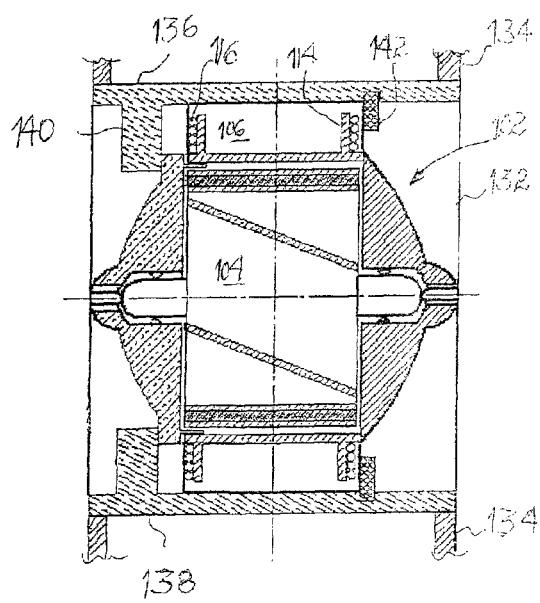
FIG. 6 is a cross-sectional view of one turbine generator unit of the apparatus shown in FIG. 5.

FIGS. 5 and 6 illustrate an apparatus 130 including a bank of three turbine-driven generators 102 affixed, in parallel to each other, in passages 132 traversing the lower part of a tubular body, e.g., a test-tube-like cylindrical housing 134, which passages 132 are separate from each other inside the cylindrical housing 134 by traverse partitions 136, 138. In combination, opposing sides of the passages 132 define a liquid inlet 133a, a liquid outlet 133b and a liquid direction axis X therebetween.

The apparatus 130 is a sealed apparatus, which can be inserted transversely into a sealable opening 158 made in the liquid pipeline 150 and removably affixed therein by means of an adapter 160. The turbine-driven generators 102 thus become arranged in a direction transverse to the flow direction of liquid in the pipeline 150. The adapter 160 can include a handle, or the like, for affixing and releasing the sealed apparatus 130 from the pipeline for any easy replacement and/or maintenance. Obviously, such a sealed apparatus 130 can be otherwise removably inserted in the pipeline 150, e.g., by screwing it into a threaded adapter 160. Electrical wires 156 are used to conduct electricity from the turbine generators, for example, to an external power storage means 181. The apparatus 130 can also be adapted for insertion into a pipeline with pressurized liquid flow, for example, by designing the adapter to further include a valve(s) that allows insertion and removal of the apparatus from the pipeline with minimum leakage therefrom. Multiple different techniques for pressurized and non-pressurized insertion of different devices in a pipeline, i.e. hot tapping, are known in the art and are equally applicable to the presently disclosed subject matter.

As can be seen in FIG. 6, the generators 102 are affixed inside the cylindrical housing 134, at one lateral side, against a ring 140, and advantageously, on the other side, by a spring-loaded catch 142. The catch 142 can be embodied in different ways, all per se known, to facilitate insertion and dislodging of a generator 102 for periodic cleaning or replacement.

It should be understood that the number of turbine-driven generators 102 included in each sealed apparatus 130 inserted in a pipeline 150, their geometry and dimensions, as well as the dimension of the apparatus itself, is a matter of choice, inter alia, depending on the diameter of the pipeline to which it is connected, the liquid flow duration and speed, the wanted or required power output, etc.

For example, in the apparatus 130 the cylindrical housing 134 can have the following parameters:
 a diameter d of the housing corresponding to the distance between the inlet and outlet of each of its current generators 102 (this diameter corresponds to that of the opening 158);
 the length L of the housing which is essentially greater than its diameter d, e.g.
 which is not less than 2d, in particular, not less than 3d, where the length L can be not less than 0.3 of the diameter of the pipeline 150, in particular not less than 0.5 of the diameter of the pipeline, or it can be in the range of 0.25 to 0.75, more particularly between 0.4 to 0.6 of the diameter of the pipeline.

If the housing 134 is designed to be non-cylindrical, than the dimension d above will refer to a circle inscribed in the cross-section of the housing taken along a plane passing though its axis X and perpendicular to a plane comprising the central axes A of all the generators 102.

Figure 7:
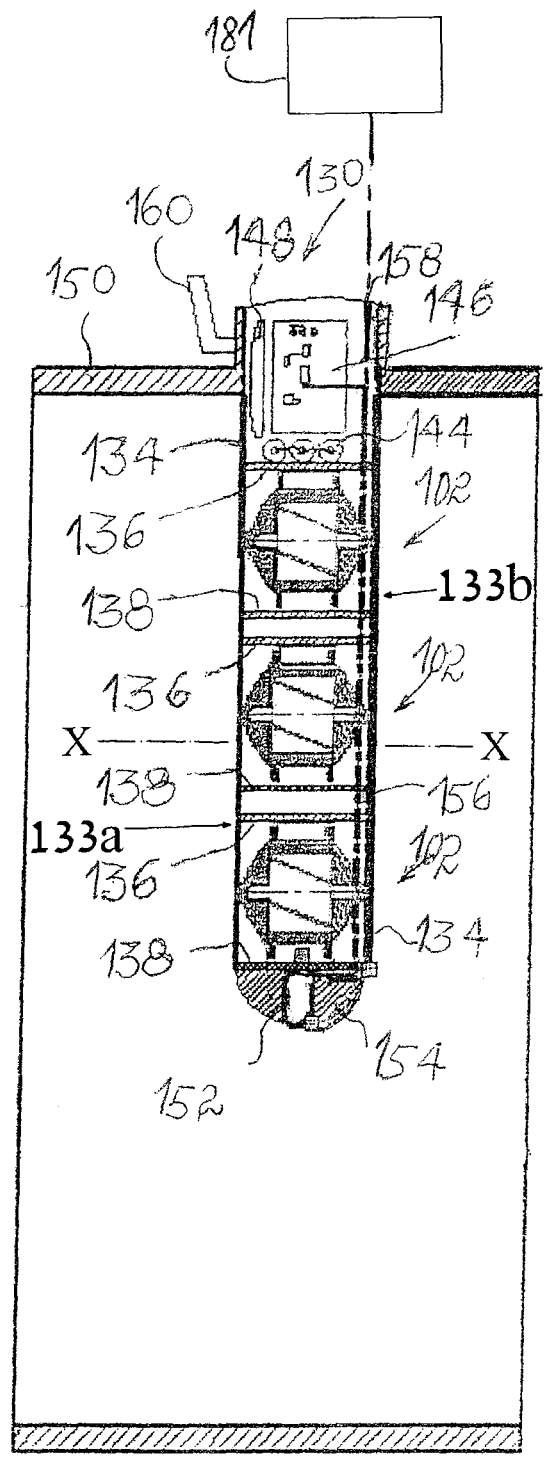
FIG. 7 is a cross-sectional view of a self-powered, remote, water-monitoring apparatus, according to an example of the presently disclosed subject matter.

FIG. 7 illustrates the apparatus 130 further adapted to serve as a self-powered, remote, water-monitoring unit and/or a unit for generation and storage of electrical energy. In this case, at the upper part of the cylinder 134, there is housed at least one accumulator 144, per-se known, measuring, controlling and communicating circuits 146, e.g., a PCB, and an antenna 148 for receiving and transmitting data from the circuits 146. The circuits 146 are powered by the accumulator 144, which is recharged by the turbine-driven generators 102 when liquid flows in a section of the pipeline 150, in which the apparatus 130 is installed. At the lower end of the cylinder 134, there is affixed a probe 152 for sensing the liquid flow in the section of the pipeline 150, and optionally, a cathode 154 for treating the surrounding liquid. The cylinder 134, supporting and housing one or more turbine-driven generators 102, coils 116, accumulator 144, circuits 146, antenna 148, probe 152 and cathode 154, are all electrically connected by wires 156. For clarity purposes, the electrical wiring or electrical connections between the accumulator 144 and the circuits 146, are not shown in FIG. 7, however, reference in this aspect is made to FIG. 8.

Figure 8:
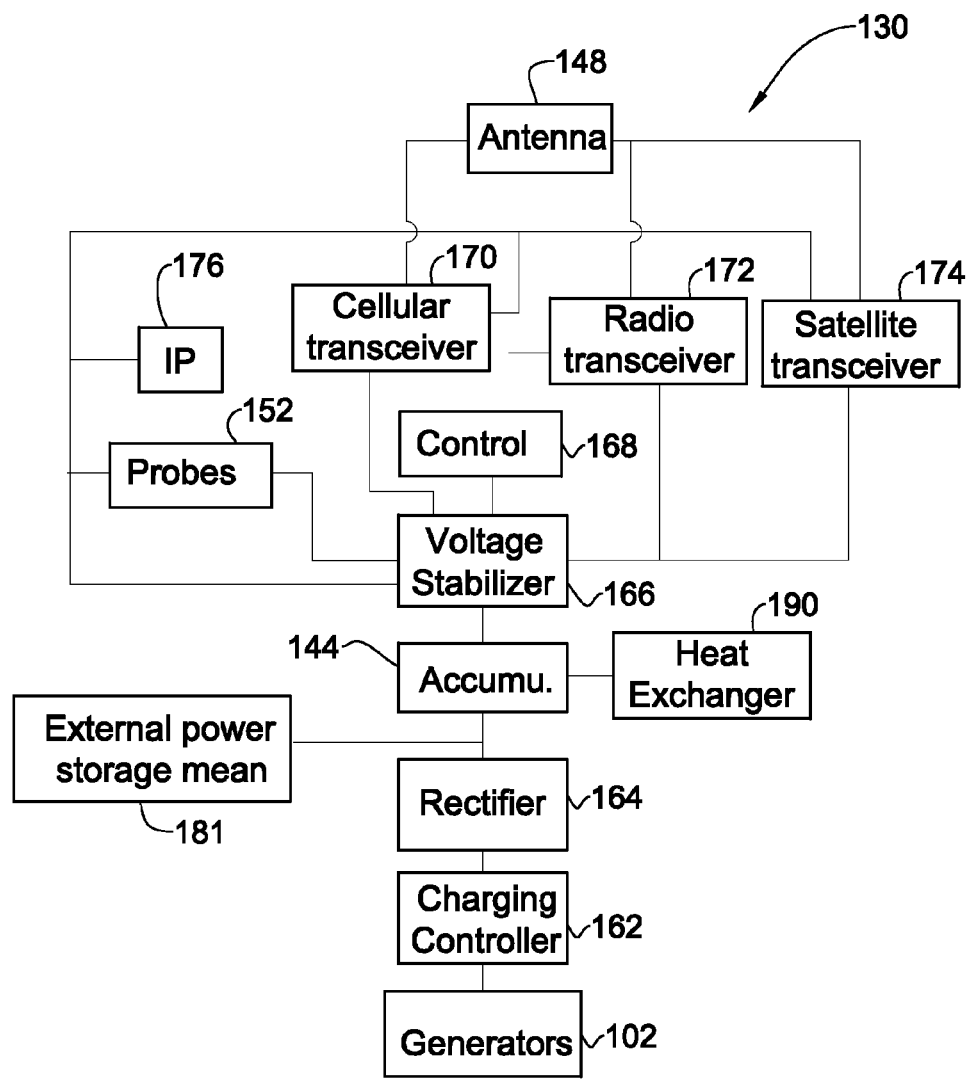
FIG. 8 is a block diagram of a self-powered, remote, water-monitoring apparatus, according to an example of the presently disclosed subject matter.

With reference to FIG. 8, the generator or bank of generators 102, are electrically connected to the accumulator 144 (or batteries) and/or can be connected, for example, to external power mean 181, via a charging controller 162 and a rectifier 164. The output from the accumulator 144 leads through a voltage stabilizer 166 to the apparatus's controller 168 operating a remote water-monitoring system via any one of the communication means, including a cellular transceiver 170, a radio transceiver 172 or a satellite transceiver 174. The latter requires an IP unit 176. The antenna 148 is operationally connected to three transceivers 170, 172 and 174. A heat-exchanger 190 can be used to heat or cool the accumulator 144 in very hot or very cold conditions that might endanger it. The heat exchanger 190 can be connected to the pipeline so that liquid from the pipeline at its ambient temperature is pumped to the heat exchanger 190 and absorb or transfer heat from or to the accumulator 144, respectively. Subsequently to passing through the heat exchanger 190, the liquid can be returned to the pipeline.

Figure 9A:
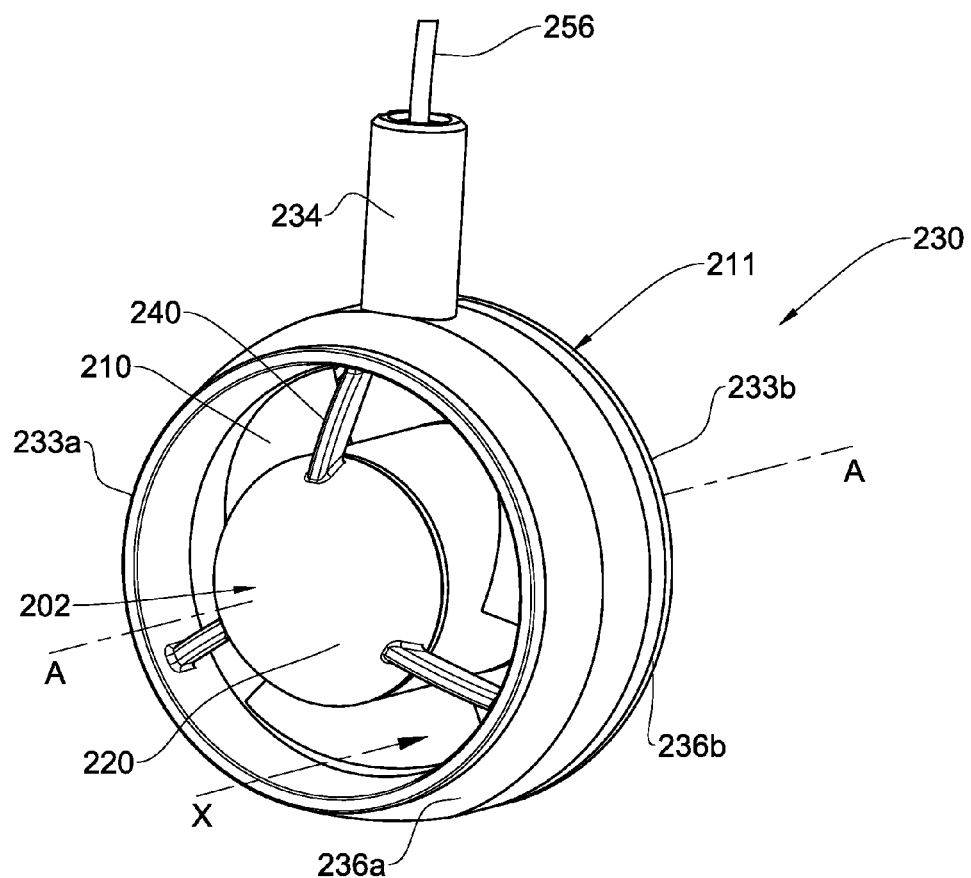
FIG. 9a—illustrates a perspective view of an apparatus according to another example of the presently disclosed subject matter.

FIG. 9a illustrates another example of an apparatus 230, according to the presently disclosed subject matter. Apparatus 230 and its components have a tubular construction symmetrical about central axis A.

Apparatus 230 comprises a housing 211 which can be received within a liquid flow path (not shown), and a turbine-driven current generator 202 disposed within housing 211. The liquid flow path can be any known in the art natural or artificial structure in which a liquid can flow so as to operate apparatus 230 for producing electrical energy. For example, housing 211 can be configured to be received within a pipeline (not shown).

Housing 211 has a central axis A, a liquid inlet 233a and a liquid outlet 233b, a forward housing part 236a associated with the liquid inlet, and a rear housing part 236b associated with the liquid outlet 233b, and a tube 234 which in this example is shown as an integral part of the forward housing part 236a and which is oriented transversely to the central axis A. The forward and rear housing parts 236a and 236b have an overlapping section along axis A and are bolted to each other. Alternatively, these housing parts can be assembled with each other in any other appropriate manner.

Figure 9B:
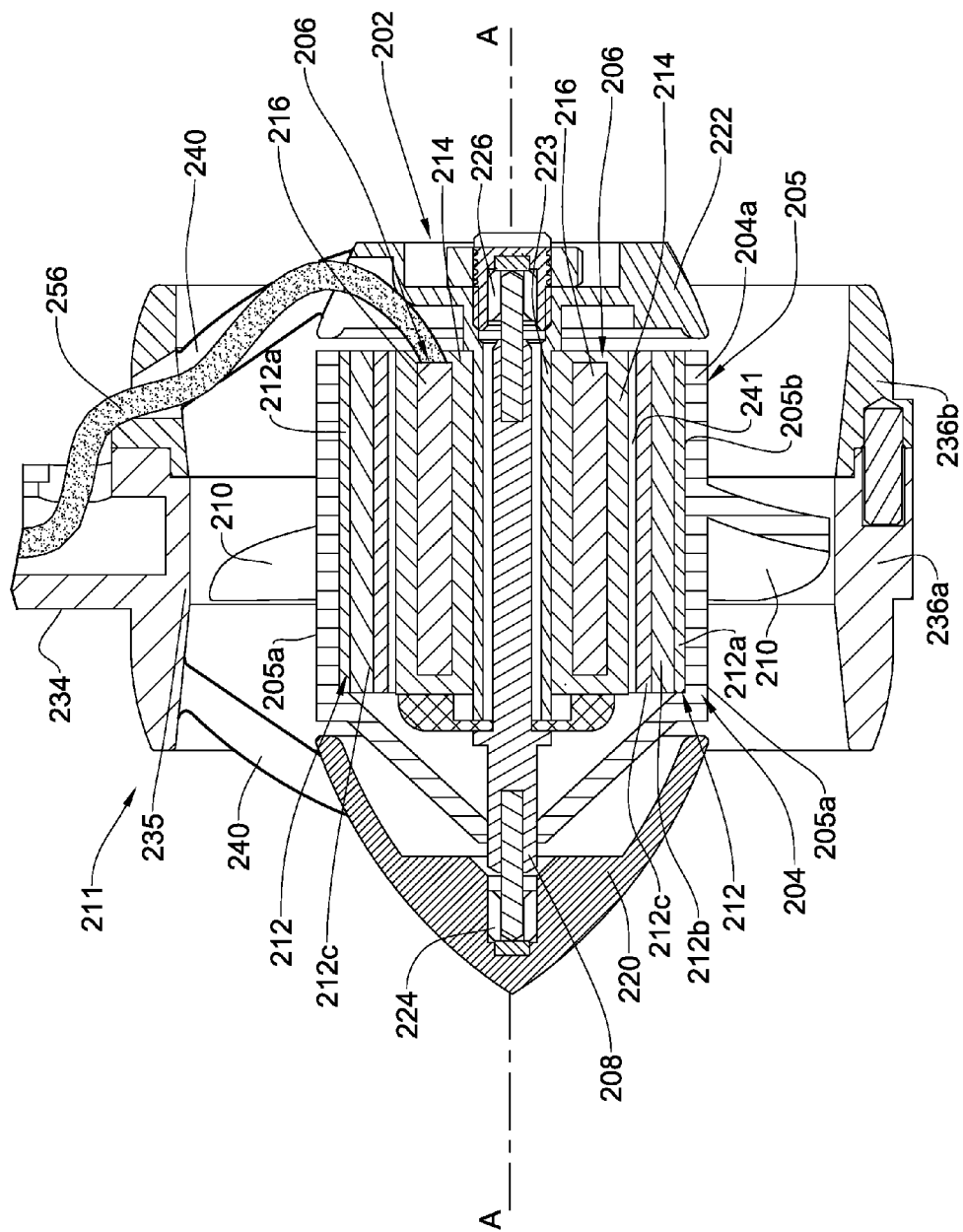
FIG. 9b is a cross-sectional view an apparatus according to a further example of the presently disclosed subject matter, taken along its central axis A.

Reference is now made to FIG. 9b which illustrates the interior which apparatus 230 can have.

Generator 202 thus comprises a shaft 208, a rotor 204 mounted thereon and having a hollow interior (not designated), a stator 206 mounted within the interior of rotor 204, an upstream housing part in the form of a cone 220 and a downstream housing part in the form of a cover 222. Shaft 208 is rotationally seated in low friction bearings 224, 226, advantageously formed in cone 220 and cover 222. Shaft 208 is adapted to rotate within low friction bearings 224 and 226 which are fixed to housing 211.

Current generator 202 is affixed to housing 211, at both lateral sides thereof, by elements 240. As such, the elements 240 can be detachably attachable to the housing to facilitate detachment of current generator 202 from housing 211, for example for replacement thereof. Elements 240 can possibly be formed as vanes so as not to overly interfere with the flow of liquid through housing 211.

Rotor 204 comprises a vane unit 205 and a magnet unit 212.

Vane unit 205 comprises a rotor body or rotor outer housing 204a having an external surface 205a and an internal surface 205b, and a plurality of vanes 210 extending outwardly from external surface 205a. The vane unit or at least the vanes can be made of a relatively flexible material to facilitate the passage of liquid therebetween from the inlet to the outlet of the generator.

Magnet unit 212 is fixed to internal surface 205b so as to surround stator 206. Magnet unit 212 has a multi-layer sleeve construction, including a magnetic element 212b disposed between an outer layer 212a that at least partially prevents the passage of magnatic field therethrough, and an inner layer 212c which allows the passage of magnetic field therethrough towards the interior of the rotor (e.g. it can be made of plastic). The outer and inner layers thus can be considered as a housing for the magnet element 212b. At least one of the materials from which the layers of the magnet unit are made can be more rigid than the material of the vane unit allowing the magnet unit to perform a stiffening function with respect to the rotor body at least at the areas thereof associated with the vanes.

Stator 206 comprises a body 214 and windings of a coil 216, which can be fully made of a metal or can be in the form of metal cores coated with a non-metal material. Stator 206 as shown is fully disposed within the interior of the rotor 204. However, this does not necessarily need to be the case. For example, whilst the entire coil 216 can be disposed within the interior of rotor 204, stator body 214 can have elements which are external to the rotor. Also, part of the coil(s) can be external to the rotor.

According to this example, body 214 of stator 206 is held within the housing 211 by a connecting sleeve 223 projecting into the interior of the rotor from the cover 222 and spaced from the shaft 208 by a gap 241, so that during the rotation of this shaft with rotor 204, stator 206 is not rotated.

At least a part of current generator elements that are disposed radially and axially outwardly relative to magnetic element 212b such as the outer layer 212a and the body 204a of the rotor, or cone 220 and/or cover 222, can be made of metal. Magnet inner layer 212c, and/or the body 214, that houses the windings of coil 216 of stator 206, can be made of plastic molded directly onto magnetic element 212b and the winding of coil 216, respectively, thus isolating and protecting them from the liquid in the pipeline, particularly that entering a gap 241 therebetween. In an alternative example, magnet inner layer 212c and/or body 214 can be made of casings having openings sealed, as known in the art, with O-rings and the like.

As mentioned above, rotor or its least its vanes 210 can be made of a flexible material. Flexible vanes can change their shape, for example bend, when encountering a relatively large object carried by the liquid in the pipeline, thus enabling such objects to pass the apparatus without causing damage thereto. For example, vanes 210 can be made of a type of thermo-plastic elastomer (TPE). The arrangement of stator 206 within rotor 204 allows vanes 210 to bend during the operation of apparatus 230.

During operation, rotor 204 with its magnetic elements 212b rotates around stator 206 with its coil 216 within housing 211, so as to produce electrical signals. The electrical signals are generated as a result of an electromagnetic induction between rotor 204 and stator 206. These electrical signals can be transferred to a power receiver (not shown) via electrical wiring 256 which electrically connects current generator 202 to the power receiver. According to a specific example, the power receiver is a power storage means (e.g., a chargeable battery, a capacitor).

Current generator 202 can be a brushless three-phase AC generator. As such, current generator 202 can be configured for operation regardless of the direction of liquid flow in the pipeline, i.e. in either direction along axis X. Naturally, cone 220 can be installed at both ends of current generator 202, instead of cover 222, to guide incoming liquid flow from either direction along the axis X. As already shown in FIG. 8, the rectifier 164 can be used to subsequently convert the AC current to DC current.

Apparatus 230 can be configured for insertion into a pipeline in such an orientation that central axis A of its current generator is parallel to longitudinal direction of the pipeline, defining thereby a flow direction in the apparatus, and so that liquid inlet (for example, liquid inlet 333a shown in FIG. 10a) of the apparatus faces in the upstream direction of the pipeline and liquid outlet (for example, liquid outlet 333b shown in FIG. 10a) faces in the downstream direction of the pipeline. For this purpose the pipeline needs to be formed with a sealable opening of a corresponding shape and dimension. Housing 211 can be configured for being removably affixed to the sealable opening by means of an appropriate adapter.

As shown in FIG. 9b, apparatus 230 further comprises a cable 256 with electrical wiring for power transfer from current generator 202 to power storages mean(s) outside the pipeline, and can possibly comprise wiring that transfers signals from sensor(s) configured to sense features of the liquid in the pipeline. Cable 256 can be run from current generator 202, in particular from its stator 206 to outside the pipeline through at least one of elements 240 and through tube 234.

Sensor(s) for sensing parameters of the liquid and its flow can be formed in the housing 211 and/or the current generator 202. In particular, at least some of the sensor(s) can be included in a unit that is controllably extendable from housing 211 or current generator 202 to expose the sensors to the liquid in the pipeline, the unit also being retractable into housing 211 or th current generator 202.

Figure 10A:
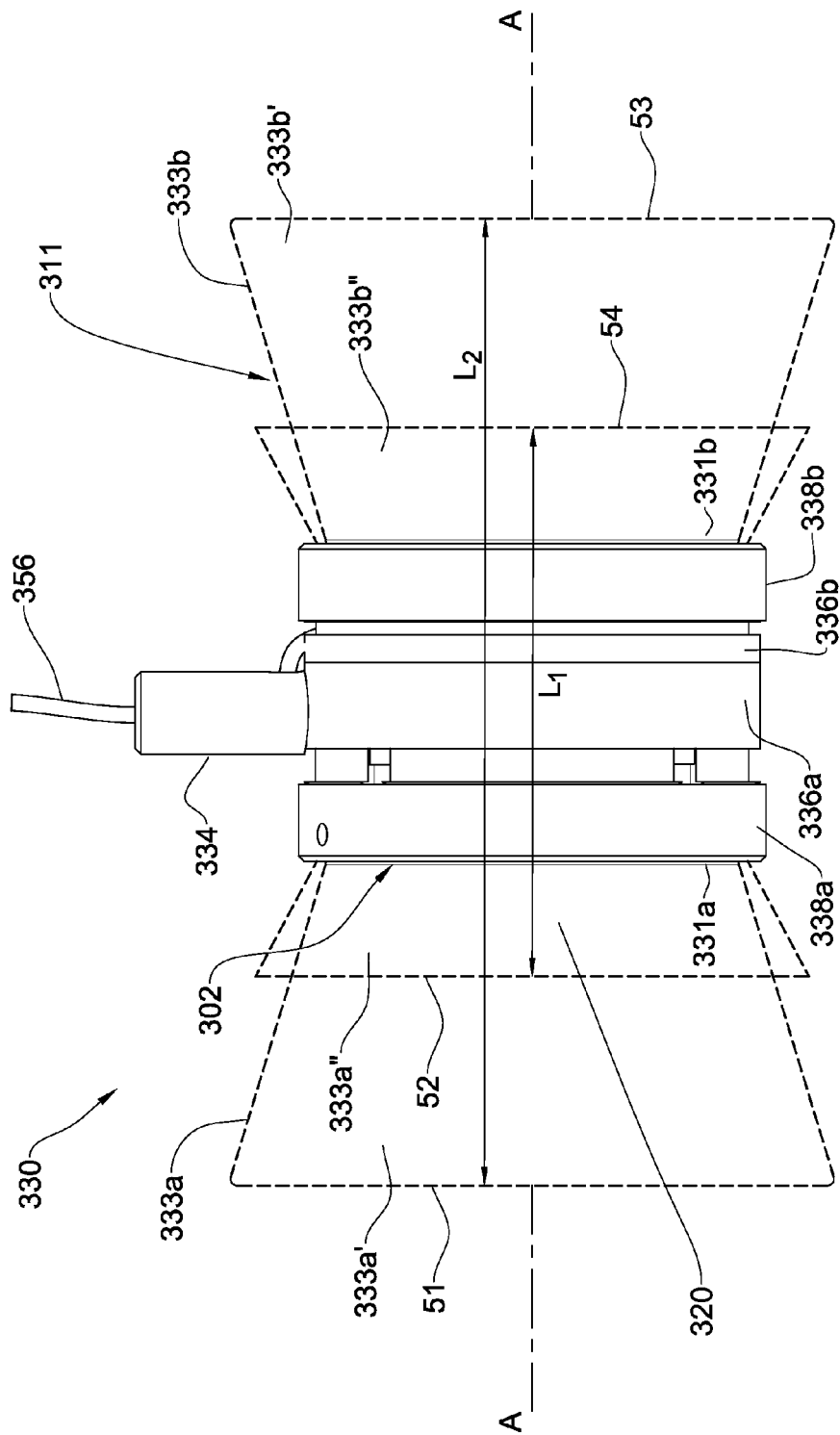
FIGS. 10a-b illustrate some further optional features of an apparatus according to the presently disclosed subject matter.
Figure 10B:
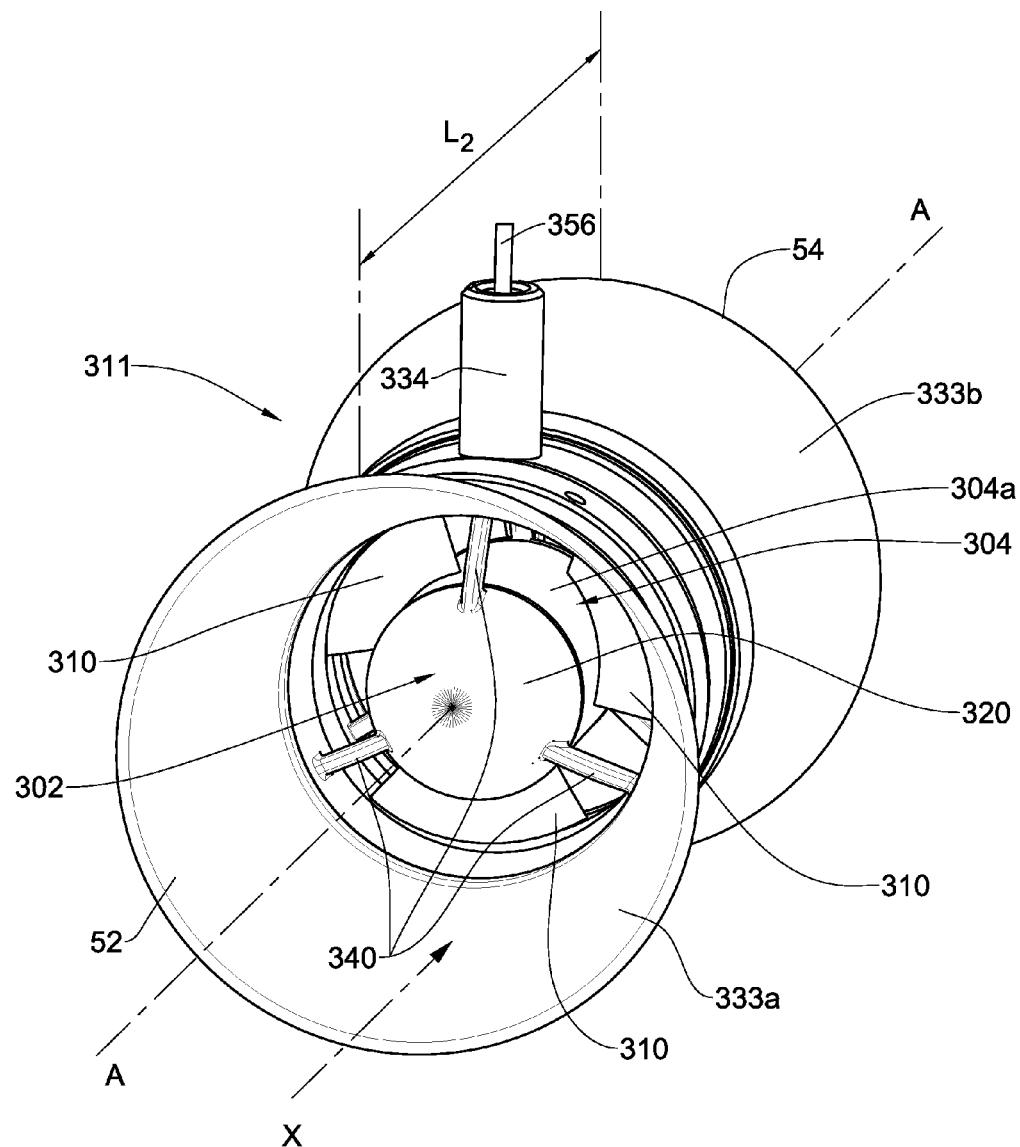

FIGS. 10a-b illustrate some further optional features of an apparatus 330 according to the presently disclosed subject matter, applicable to any of the above examples and combinations thereof. FIG. 10c illustrates the use of features shown in FIGS. 10a-b with an apparatus similar to that shown in FIG. 9a-b. Parts similar to those that appeared in FIGS. 9a-b, are numbered in similar manner.

As shown in FIG. 10a apparatus 330 comprises a housing 311 and a current generator 302, whose all elements have a generally tubular construction about a central axis A of the apparatus. According to this example, housing 311 comprises: a liquid inlet 333a and a liquid outlet 333b at two opposite ends of the apparatus along its axis A, a forward intermediate housing part 336a, a rear intermediate housing part 336b, an inlet attachment part 338a, an outlet attachment part 338b, and the tube 334. Liquid inlet 333a and liquid outlet 333b define a liquid flow direction therebetween which is parallel to axis A. Inlet and outlet attachment parts 338a and 338b are screwed onto the forward and rear intermediate housing parts 336a and 336b, respectively. According to other example, inlet and outlet attachment parts 338a and 338b can be molded and can be made of a type of thermo-plastic elastomer (TPE).

According to this example, liquid inlet 333a and liquid outlet 333b are configured for taking an undeployed state and a deployed state, both presented in FIG. 10a, in dotted lines. According to other examples, only one of liquid inlet 333a and liquid outlet 333b can be configured for taking an undeployed state and a deployed state.

Due to the ability of liquid inlet 333a and/or liquid outlet 333b to be in the undeployed state, their size and the total dimensions of apparatus 330 can be reduced relatively to the deployed state of liquid inlet 333a and/or liquid outlet 333b. This feature of apparatus 330 can be exploited for the insertion of apparatus 330 into a pipeline through a sealable opening which has predetermined limited dimensions (such as a predetermined diameter). For this purpose, apparatus 330 can be insertable into the pipeline through its sealable opening in the undeployed state 333a', and 333b' respectively, and after the insertion, can take their deployed state 333a" and 333b", respectively. It is clearly seen in FIG. 10a, that the dimensions of liquid inlet 333a and liquid outlet 333b in the undeployed state (333a' and 333b'), are much smaller than their dimensions in the deployed state (333a" and 333b"). This enables apparatus 330 to be inserted into the pipeline through a significantly smaller sealable opening. This feature of apparatus 330 can be important when the dimensions of the sealable opening are limited, and the operator prefers not to enlarge these dimensions for the insertion of apparatus 330 into the pipeline. Subsequently, after apparatus 330 is inserted into the pipeline, the liquid inlet 333*a* and liquid outlet 333*b* can be brought from their undeployed state into their deployed state. This can be performed, for example, automatically due to the elastic properties of inlet 333*a* and outlet 333*b*.

According to the example illustrated in FIG. 10*a*, liquid inlet 333*a* and/or liquid outlet 333*b* in the undeployed state are provided in a folded configuration, and they can take the deployed state by a natural elongation and/or elasticity of the material(s) from which they are made. According to some examples, liquid inlet 333*a* and liquid outlet 333*b* can be made of flexible materials, such a various type(s) of silicone (s).

According to other examples, liquid inlet 333*a* and/or liquid outlet 333*b* can be converted from the undeployed state to the deployed state (and vice versa) by an activation mechanism. The activation mechanism can be, for example, an elongated element which can be pulled and/or pushed, and a result of that, the state of liquid inlet 333*a*, and/or liquid outlet 333*b*, can be changed.

According to other examples, inlet 333*a* and outlet 333*b* can be such that they are inflatable from the undeployed state in which they are deflated into the deployed state in which they are inflated. This can be performed by the liquid flowing in the liquid flow path (e.g., a pipeline) and/or by a compressed gas stored in housing 311 or supplied from an external gas source via an appropriate tubing.

For example, such tubing can extend to the housing 311 alongside cable 356. According to other examples, the inlet 335*a* and outlet 335*b* can be inflated to their full or partial increased sizes, by the liquid flowing in the pipeline, thereby reconfigured from the undeployed to the deployed state. Inflation and/or deflation can be facilitated, for example, by making the inlet and/or outlet elastic so that its relaxed state is corresponds to its deployed state, whereas during insertion into the pipeline the inlet and/or outlet is forced into an undeployed state. Alternatively, active inflation and/or deflation means, such as a small pump(s) can be used. Other inflation/deflation mechanisms, or combinations of the above mechanisms, are also possible as would be apparent to those skilled in the art.

According to the example illustrated in FIG. 10*a*, apparatus 330 in its undeployed state has a first maximal length L1 along axis A which is the distance between an edge 52 of the liquid inlet 333*a"* and an edge 54 of the liquid outlet 333*b"*, and in its deployed state has a second maximal length L2 along the axis A which is the distance between an edge 51 of the liquid inlet 333*a'* and an edge 53 of the liquid outlet 333*b'*. According to FIG. 10*a*, the length L1 is smaller than the length L2 (L1<L2).

At times, there can be a need to change the rate of liquid flow through the housing 311. This can be achieved by liquid inlet 333*a* and/or liquid outlet 333*b* configured so that their geometrical parameters can be controlled. These parameters can be, for example, at least one of the throat area and the entrance section area. In some exemplary cases—when the rate of liquid flow to the current generator 302 is very high, it might be generating too much energy (which can cause it to overheat and damage it).

In this case, the geometrical dimensions of liquid inlet 333*a* and/or liquid outlet 333*b* can be controlled, per the above, so as to reduce this rate of flow.

The above control of geometrical parameters of liquid inlet 333*a* and/or liquid outlet 333*b* can be affected subsequent to indication(s) of the rate of liquid flow through housing 311. As already described above, such indication(s) can be based on various signals including, but not limited to, at least one of: rotation speed of rotor 304, power provided by current generator 302, pressure differences of the liquid flowing through the housing 311, etc. as would be apparent to those skilled in the art.

Alternatively or additionally, liquid inlet 333*a* and/or liquid outlet 333*b* can be configured to automatically control the rate of liquid flow therethrough as a function of the rate of liquid flow required for operation of the current generator 302 at its peak efficiency. As would be apparent to those skilled in the art, such control can be achieved by configuring liquid inlet 333*a* so that its shape changes due to pressure differences between liquid inside and outside liquid inlet 333*a*, which depend on the total rate of liquid flow in the pipeline. In particular, a flexible or partially flexible liquid inlet 333*a*, e.g. the inflatable inlet 333*a* described above can be configured to change its shape or the shape of some of its parts, respectively. Alternatively or additionally, at least some parts of the inlet 333*a* can be configured to change their orientation with respect to each other or to the current generator 302, for example, by being connected with springs.

In some examples, a circuit-breaker can be used to cut the load on the current generator 302 when the rate of liquid flow through the housing 311 becomes too high.

According to different examples, the liquid inlet and/or the liquid outlet can assume at least one third intermediate state which is between the undeployed state and the deployed state (not shown). In this intermediate state, the liquid inlet and/or the liquid outlet can be in a partially deployed state.

In some further particular examples, inlet 333*a* and/or outlet 333*b* can be constructed of a number of rigid or semi-rigid sections at least some of which are deployable, axially away from the current generator 302 (i.e. along the axis A) and/or radially (i.e. from the axis A), from the undeployed state to the deployed state of the inlet 333*a* and/or outlet 333*b*. In these examples, the size of the apparatus 330 is still reduced in the undeployed state of the liquid inlet 333*a* and/or liquid outlet 333*b*, for example prior to insertion into the pipeline, and liquid inlet 333*a* and/or liquid outlet 333*b* are deployable, for example after insertion of the apparatus 330 into the pipeline.

One exemplary manner of producing the inlet 333*a* and the outlet 333*b* is by injecting them in molds configured therefor and in spaces in the inlet attachment part 338*a* and the outlet attachment part 338*b*, respectively, as visible in the cross-section shown in FIG. 10*c*.

Reference is now made to FIG. 10*c* which illustrates apparatus 311 similar to that shown in FIG. 9*b* and with the only difference therebetween being in the use of inlet 333*a* and outlet 333*b* constructions diverging in the direction away from the current generator 302, as shown.

Figure 11:
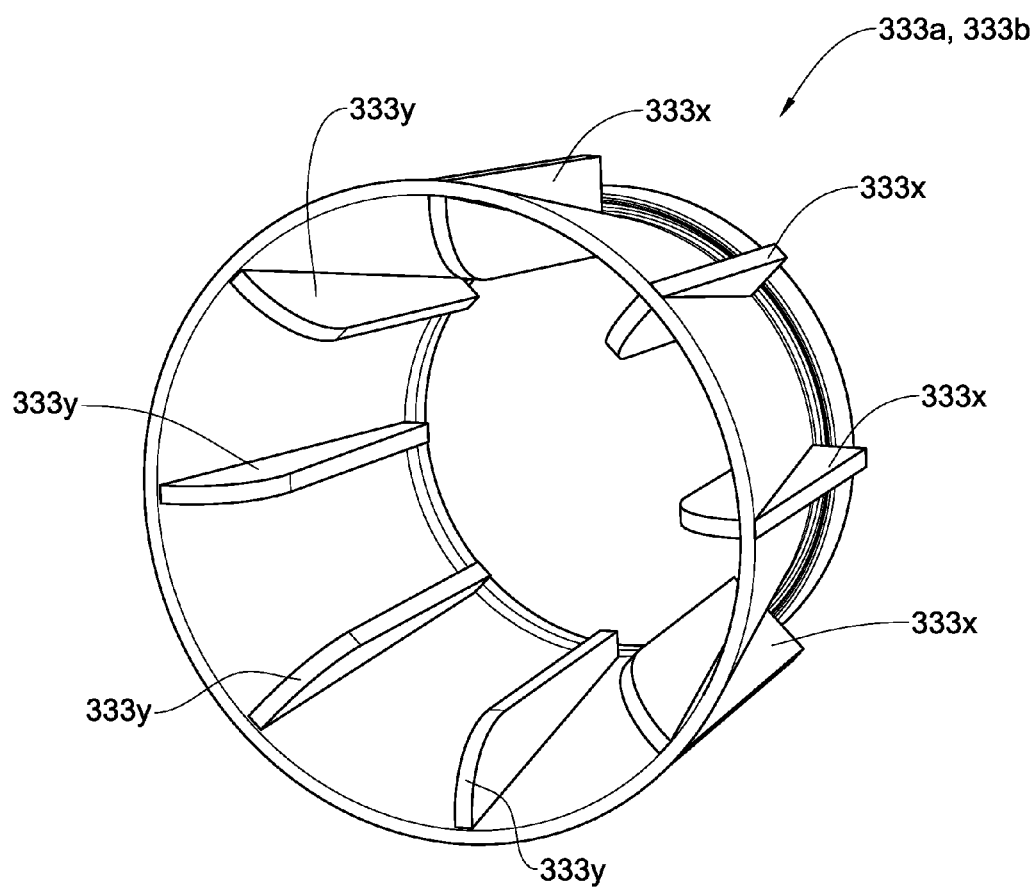
FIG. 11 illustrates another example of features shown in FIGS. 10a-b, according to the presently disclosed subject matter.

FIG. 11 shows another example of the inlet 333*a* or outlet 333*b* having inner ribs 333*y* and outer ribs 333*x*. The inner ribs 333*y* and the outer ribs 333*x* can help direct the flow of liquid along the flow direction X through the housing 311. The inner ribs 333*y* and the outer ribs 333*x* can also be configured so as to provide structural strength, i.e. reinforce and help to maintain shape, to the inlet 333*a* and outlet 333*b*, especially when they are inflatable.

It is noted that the apparatus can comprise further parts as described above with respect to other examples of apparatuses of the presently disclosed subject matter, and parts of all of the above examples, wherein these parts perform equivalent functions as would be apparent to those skilled in the art, are interchangeable. In particular, the apparatus of the above example can comprise further parts as described above with respect to FIG. 8 wherein the generator 302 can substitute generator(s) 302.

Figure 12A:
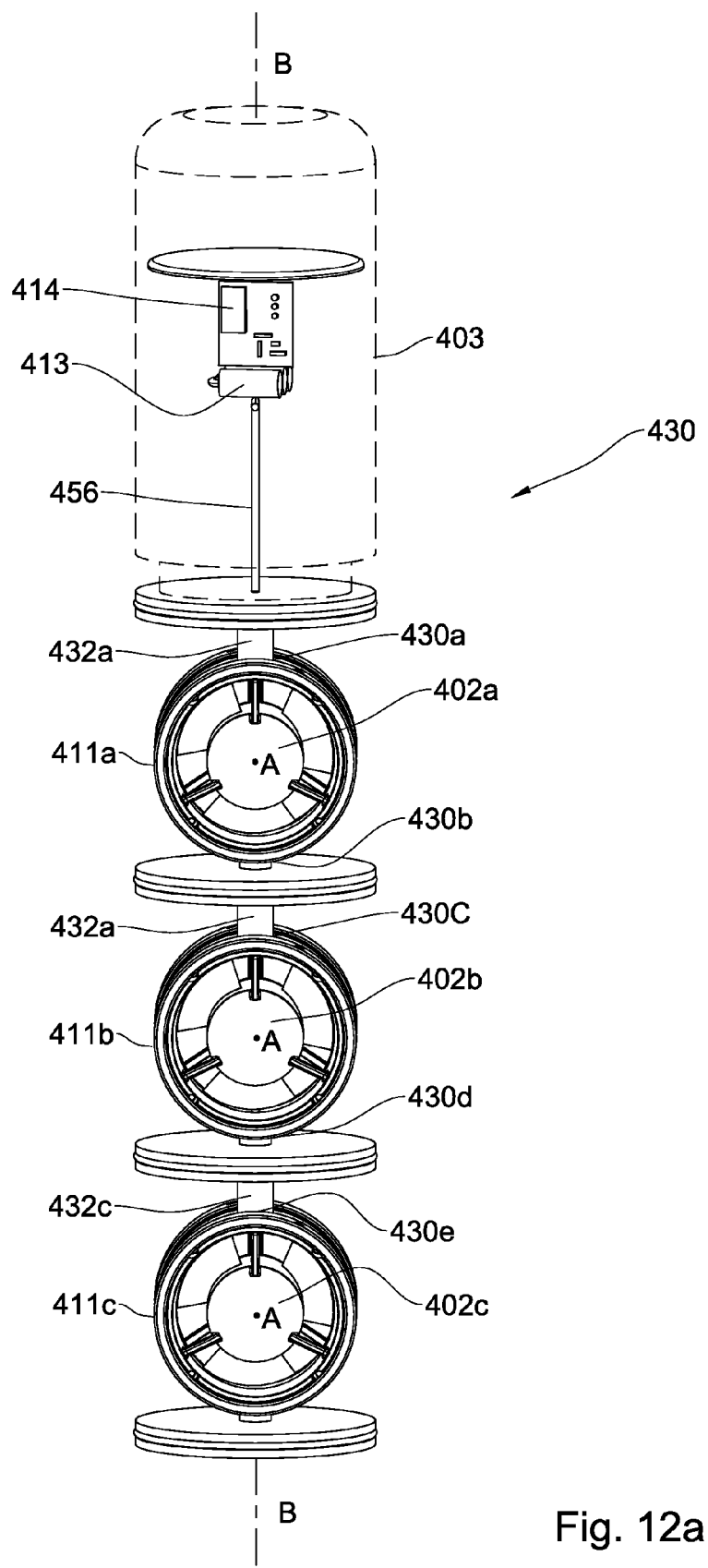
FIG. 12a illustrates a front isometric view of an apparatus according to a further example of the presently disclosed subject matter, with its upper portion being shown as transparent for the purpose of illustration.

FIG. 12a is a front isometric view of an apparatus 430. Apparatus 430 includes a bank of three current generators 402a, 402b, and 402c with their corresponding housings 411a, 411b, and 411c, respectively. Housings 402a, 402b, and 402c are mounted so that their central axes A are parallel to each other and are perpendicular to longitudinal axis B of the apparatus 440. As can be seen in this figure, housing 402a has two ends: a first end 430a and a second end 430b. First end 430a is connected via a connector 432a to a controlling unit 403 having researchable batteries 413 and a controller 414. Controller 414 is responsible for the operation of apparatus 430. Second end 430b is connected via a connector 432b to a first end 430c of housing 411b, and a second end 430d of housing 411b is connected via a connector 432c to a first end 430e of housing 411c.

According to different examples of the presently disclosed subject matter, housings 411a, 411b, and 411c, and/or current generators 402a, 402b, and 402c can be configured as one of the housings and/or current generators illustrated in FIGS. 1-11. For example, housings 411a, 411b, and 411c can have a liquid inlet and/or a liquid outlet being configured for taking an undeployed state and a deployed state. The housings 411a, 411b, and 411c of FIG. 12a are identical to housing 211 clearly illustrated in FIG. 9a. Current generators 402a, 402b, and 402c presented in FIG. 12a are identical to current generator 202 described above.

Electrical wiring 456 is configured for electrically connecting current generators 402a, 402b, and 402c to researchable batteries 413 for transferring the generated electrical signals thereto.

The apparatus 430 is adapted for insertion into a pipeline via a sealable opening with or without pressurized liquid flow, for example, by designing the adapter to further include a valve(s) that allows insertion and removal of the apparatus from the pipeline with minimum leakage therefrom. Multiple different techniques for pressurized and non-pressurized insertion of different devices in a pipeline, i.e. hot tapping, are known in the art and are equally applicable to the presently disclosed subject matter.

According to other examples, apparatus 430 can be received within any liquid flow path (not shown) and affixed thereto. The liquid flow path can be any known in the art natural or artificial structure in which a liquid can flow so as to operate apparatus 430 for producing electrical energy. For example, the liquid flow path can be a river, a pipeline, a tube, a channel, and a canal. According to different examples, apparatus 430, can be used to direct some or all of the electric power generated thereby to any other power storage means different from the researchable batteries 413, for example to an external power storage means (not shown). This external power storage means can be used for any purpose, e.g., to charge accumulators, power water supply sensors or pumps, to be introduced into the public power grid or any other electrical infrastructure, etc.

Figure 12B:
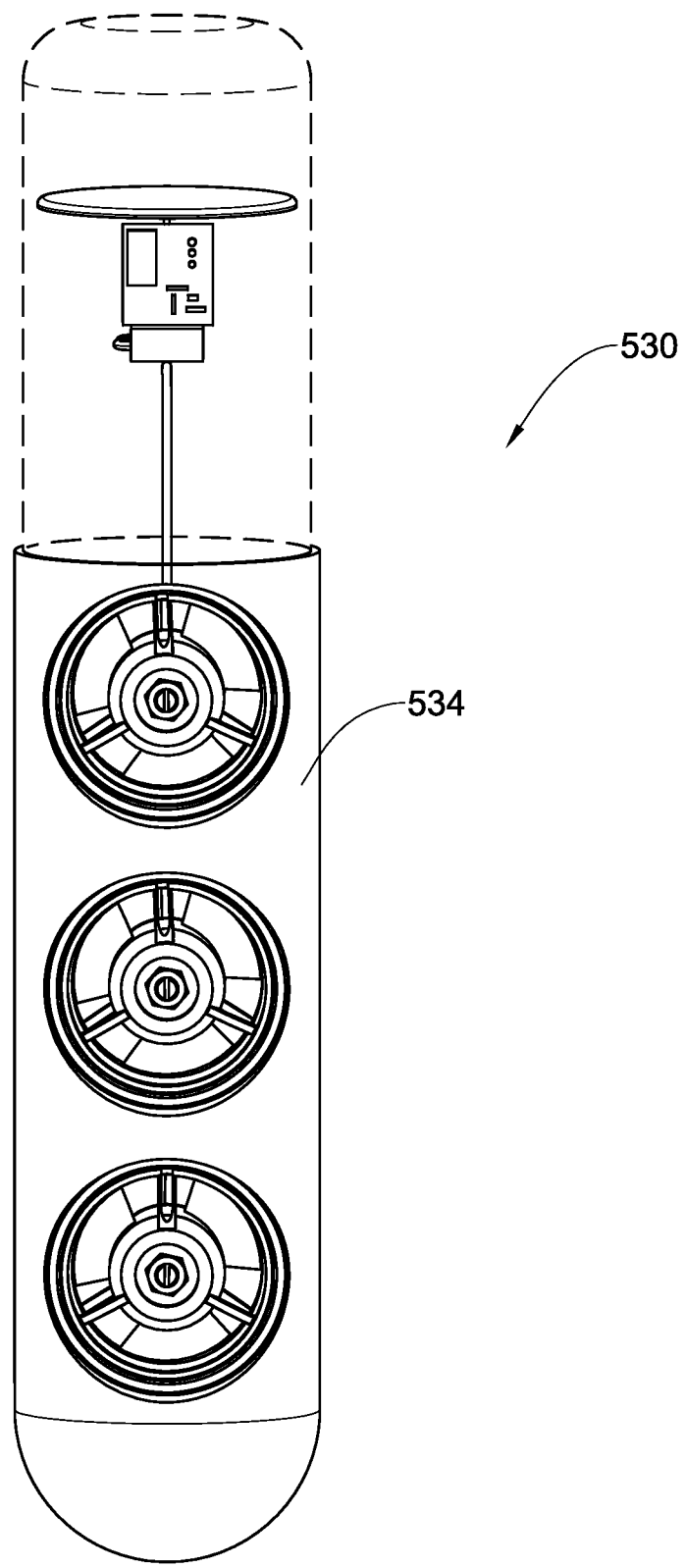
FIG. 12b illustrates a front isometric view of an apparatus according to a further example of the presently disclosed subject matter, with its upper portion being shown as transparent for the purpose of illustration; and, FIGS. 13a-b illustrate a side view of the apparatus shown in FIG. 12b, within a pipeline, in respective undeployed and deployed states.

FIG. 12b illustrates a isometric front view of an apparatus 530 which is substantially identical to apparatus 430 but provided with a common tubular cylindrical housing 534.

FIGS. 13a-b illustrate a side partially transparent view of an apparatus 630 being received within a pipeline 640 through a sealable opening 642. Apparatus 630 is substantially similar to apparatus 530, but additionally comprises liquid inlets 635a, 635b, and 635c, and liquid outlets 635d, 635e, 635f which are presented in the undeployed state (in FIG. 13a), and which are configured for taking a deployed state. FIG. 13b illustrates liquid inlets 633a, 633b, and 633c, and liquid outlets 633d, 633e, 633f in the deployed state. As can be seen in FIGS. 13b, liquid inlets 633a, 633b, and 633c, and liquid outlets 633d, 633e, 633f define a liquid direction axis X therebetween. Apparatus 630 is insertable into pipeline 640 so that the shaft of the current generator is parallel to longitudinal direction of the pipeline, and both are parallel to liquid direction axis X.

According to FIG. 13a, apparatus 630 has, in its undeployed state, a first maximal dimension D1 of its cross-sectional area E1 taken perpendicular to longitudinal axis B thereof. According to this example, D1 is a diameter of an imaginary cylinder F1 which inscribes apparatus 630 in the undeployed state. According to FIG. 13b, apparatus 630 has a second maximal dimension D2 of a cross-sectional area E2 in the deployed state. According to this figure, D2 is a diameter of an inscribing imaginary cylinder F2 which inscribes apparatus 630 in the deployed state, and E2 is a cross-section of imaginary cylinder F2.

According to different examples of the presently disclosed subject matter, the second maximal dimension D2 is greater than the first maximal dimension D1. The ratio between the second maximal dimension (e.g., D2) of a cross-sectional area (e.g., E2) and the first maximal dimension (e.g., D1) of a cross-sectional area (e.g., E1) can be in the range of about 1.1 to about 5, but does not exceed 5, particularly does not exceed 4, still more particularly, does not exceed 3.

In FIG. 13a, in which liquid inlets 635a, 635b, and 635c, and liquid outlets 635d, 635e, 633f are in the undeployed state, apparatus 630 is able to pass through sealable opening 642 due to the size of diameter D1 which is substantially smaller (or almost the same) than the cross-sectional diameter D3 of sealable opening 642 (in the plane of cross-section E1). In the deployed state of liquid inlets 633a, 633b, and 633c, and liquid outlets 633d, 633e, 633f illustrated in FIG. 13b, it is clearly seen that D3 is smaller than D2. This figure clearly shows that apparatus 630 could not been inserted into pipeline 640 because of its elevated dimensions. Due to the ability of apparatus 630 to be deployed within pipeline 640, it can be inserted into pipeline 640 through a significantly smaller sealable opening, than in the case of rigid liquid inlet and liquid outlet which are non-deployable.

According to another example of the presently disclosed subject matter, an array of apparatuses 630 (slave units) can be inserted into a pipeline, and connected to one central power collecting unit (master unit) which is configured to collect the power for a current generator of each apparatus.

It should be understood that the apparatus of the above examples, its generator(s) and housing, can have geometries, dimensions, etc. that are a matter of choice, inter alia, depending on the diameter of the pipeline with which the apparatus is used, parameters of the liquid and its flow in the pipeline, the wanted or required power output, etc.

A plurality of apparatuses according to the presently disclosed subject matter can be received within a pipeline in the manner shown, for example, in FIG. 5, 9a, 10a, 10B or any other suitable manner, which would result in greater energy production, more accurate liquid flow measurement, etc. Wherein the apparatuses further comprise communication means, a system of apparatuses can be linked by a wired or a short range wireless connection that enables communication between them and at least one of the apparatuses which has a long range wireless communication mean/s for communicating information regarding the entire system of apparatuses to a distant monitoring station.

The apparatus is adaptable for use with a liquid of any type, e.g., water, salt-water, sewage, oil, fuel and etc. Standard corresponding adaptations of the components of the apparatus, such as protective surface coatings, blade geometry and the like are thus assumed to be within the scope of the presently disclosed subject matter.

Multiple types of sensors and means for interaction with the liquid flow can be mounted on or inside the housing of the apparatus and can be used for sensing liquid flow and/or interacting therewith, as would be appreciated by those skilled in the art. For example, a small turbine for measuring liquid flow therethrough, pressure sensors, magnetic flow meters, sensors that measure: conductivity, pH, turbidity, chlorine content, dissolved oxygen content and etc, other sensors that can discern the chemical composition of a liquid, means for affecting the chemical composition of a liquid, means for affecting the hydrodynamics of a liquid in the pipeline, filters, etc. Electrochemical liquid treatment equipment can be added, for example, in the form of a cathode for treating the liquid and preventing corrosion of the pipeline.

The invention claimed is:

1. An apparatus for positioning thereof in a liquid flow path, for transforming energy of liquid passing therethrough into electrical energy, comprising:
   at least one housing configured to be received in said flow path and having a liquid inlet and a liquid outlet defining a flow direction therebetween;
   at least one current generator including a shaft supported by said housing and having a rotor mounted thereon and having a plurality of vanes, said shaft extending in the housing along said flow direction allowing rotation of the rotor with said vanes by liquid passing through the generator, and a stator associated with said rotor for producing electrical signals corresponding to the rotation of said rotor; and,
   electrical wiring for electrically connecting the at least one current generator to a power receiver for transferring said electrical signals thereto;
   at least one of the liquid inlet and the liquid outlet being configured for taking an undeployed state and a deployed state.

2. An apparatus as defined in claim 1, wherein said housing is configured for being received within a pipeline.

3. An apparatus as defined in claim 2, wherein said apparatus is configured to be inserted into said pipeline through a sealable opening when at least said one of the liquid inlet and the liquid outlet is in said undeployed state, and to take said deployed state when said apparatus is positioned within said pipeline.

4. An apparatus as defined in claim 1, further including said power receiver, said power receiver being a power storage means.

5. An apparatus as defined in claim 1, wherein the rotor comprises at least one magnetic element, the stator comprises at least one coil, the magnetic element of the rotor is configured to rotate with respect to windings of the at least one coil, so as to produce the electrical signals as a result of a magnetic association between the rotor and the stator.

6. An apparatus as defined in claim 5, wherein the at least one coil is disposed within the rotor.

7. An apparatus as defined in claim 5, wherein the rotor comprises a vane unit including a hollow rotor body having an external surface and an internal surface, said vanes extending outwardly from the external surface; and a magnet unit fixed to the internal surface of the rotor body and defining a rotor interior space, said coil being disposed within said interior space.

8. An apparatus as defined in claim 1, configured for measuring the amount of liquid passing through the housing, and further comprising:
   a controller for receiving the electrical signals for processing and producing output signals indicative of said amount of liquid; and
   wherein the power receiver includes a power storage and supply unit configured to charge the apparatus and to supply power to said controller required for its operation.

9. An apparatus for positioning thereof in a liquid flow path, for transforming energy of liquid passing therethrough into electrical energy, comprising:
   at least one housing configured to be received in said flow path and having a liquid inlet and a liquid outlet defining a flow direction therebetween;
   at least one current generator supported by said housing and including:
      a shaft with a rotor mounted thereon and having a plurality of vanes, the shaft extending in the housing along said flow direction allowing rotation of the rotor with said vanes by liquid passing through the generator; and
      a stator at least partially disposed within the rotor and associated therewith for producing electrical signals corresponding to the rotation of the of the rotor with respect to the stator; and
   electrical wiring for electrically connecting the at least one current generator to a power receiver for transferring said electrical signals thereto.

10. An apparatus as defined in claim 9, wherein the stator is fully disposed within the rotor.

11. An apparatus as defined in any of claims 9, wherein the rotor comprises at least one magnetic element, the stator comprises at least one coil, the magnetic element of the rotor is configured to rotate with respect to windings of the at least one coil, so as to produce the electrical signals as a result of a magnetic association between the rotor and the stator.

12. An apparatus as defined in claim 9, wherein the rotor comprises a vane unit including a hollow rotor body having an external surface and an internal surface, said vanes extending outwardly from the external surface; and a magnet unit fixed to the internal surface of the rotor body and defining a rotor interior space, said coil being disposed within said interior space.

13. An apparatus as defined in claim 12, wherein said magnet unit having a magnet housing and said at least one magnetic element disposed therein, wherein the magnet housing is made of a material which is configured to allow passage of a magnetic field therethrough.

14. An apparatus as defined in claim 9, wherein at least said one of the liquid inlet and the liquid outlet is configured for taking an undeployed state and a deployed state.

15. An apparatus as defined in claim 9, wherein said housing is configured for being received within a pipeline.

16. An apparatus as defined in claim 9, wherein said housing is configured to be inserted into a pipeline through a sealable opening when at least said one of the liquid inlet and the liquid outlet is in said undeployed state, and to take said deployed state when said apparatus is positioned within said pipeline.

17. An apparatus as defined in claim 9, further including said power receiver, said power receiver being a power storage means.

18. A method for transforming energy of liquid passing in a liquid flow path into electrical energy, the method comprising:
   providing an apparatus comprising: at least one housing configured to be received in said flow path and having a liquid inlet and a liquid outlet defining a flow direction therebetween; at least one current generator including a shaft supported by said housing, a rotor with a plurality of vanes attached thereto, said shaft extending in the housing along said flow direction allowing rotation of the rotor with said vanes by liquid passing through the generator, and a stator associated with said rotor for producing electrical signals corresponding to the rotation of said rotor; and electrical wiring for electrically connecting the at least one current generator to a power receiver for transferring said electrical signals thereto;

inserting the housing with at least said one of the liquid inlet and the liquid outlet in said undeployed state into said liquid flow path so that said flow direction is substantially parallel to the direction of the flow of said liquid;

having at least said one of the liquid inlet and the liquid outlet take said deployed state;

allowing rotation of the rotor by liquid passing through the housing, and correspondingly producing electrical signals by the stator; and transferring said electrical signals through the electrical wiring from the at least current generator to said power receiver.

19. An method as defined in claim 18, wherein said step of inserting said housing into said liquid flow path can be performed by inserting said housing into a pipeline.

20. An method as defined in claim 18, further comprising measuring the amount of liquid passing through the current generator.

* * * * *